United States Patent
Hirabayashi

(10) Patent No.: US 9,459,484 B2
(45) Date of Patent: Oct. 4, 2016

(54) ELECTRO-OPTICAL MODULE WITH HEAT DISSIPATION MEMBER AND FRAME FOR HEAT RELEASE AND PROJECTION-TYPE DISPLAY APPARATUS

(71) Applicant: Seiko Epson Corporation, Tokyo (JP)

(72) Inventor: Hidekazu Hirabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 14/539,995

(22) Filed: Nov. 12, 2014

(65) Prior Publication Data

US 2015/0153612 A1 Jun. 4, 2015

(30) Foreign Application Priority Data

Nov. 29, 2013 (JP) ................. 2013-247382

(51) Int. Cl.
*G02F 1/1333* (2006.01)
*H04N 9/31* (2006.01)
*H04N 5/74* (2006.01)

(52) U.S. Cl.
CPC ... *G02F 1/133385* (2013.01); *G02F 1/133308* (2013.01); *H04N 5/7441* (2013.01); *H04N 9/3144* (2013.01)

(58) Field of Classification Search
CPC .................. G02F 1/133385; G02F 1/133308; H04N 5/7441; H04N 9/3144
See application file for complete search history.

(56) References Cited

U.S. PATENT DOCUMENTS

| | | | |
|---|---|---|---|
| 5,835,179 | A | 11/1998 | Yamanaka |
| 6,069,677 | A | 5/2000 | Kitai |
| 2004/0136146 | A1 | 7/2004 | Saitoh et al. |
| 2006/0001821 | A1 | 1/2006 | Dewa et al. |
| 2013/0077058 | A1 | 3/2013 | Miyashita |
| 2013/0083268 | A1 | 4/2013 | Hirabayashi |

FOREIGN PATENT DOCUMENTS

| | | |
|---|---|---|
| JP | 10-123964 A | 5/1998 |
| JP | 10-232629 A | 9/1998 |
| JP | 2004-194785 A | 7/2004 |
| JP | 2004-198933 A | 7/2004 |
| JP | 2004-294785 A | 10/2004 |
| JP | 2005-196027 A | 7/2005 |
| JP | 2006-18055 A | 1/2006 |
| JP | 2006-276623 A | 10/2006 |
| JP | 4179239 B | 11/2008 |
| JP | 4613663 | 1/2011 |
| JP | 2013-068873 A | 4/2013 |
| JP | 2013-073184 A | 4/2013 |
| JP | 2013-073185 A | 4/2013 |

*Primary Examiner* — Joseph L Williams
(74) *Attorney, Agent, or Firm* — ALG Intellectual Property, LLC

(57) ABSTRACT

In an electro-optical module, a frame does not exist on a side surface of a first substrate on the side where a protrusion portion is positioned or at a position of a second substrate facing a side surface. Between the frame and an electro-optical panel, a heat dissipation member that includes a frame portion is disposed, which faces a surface of the protrusion portion of the first substrate on the second substrate side, a side surface of the second substrate and the side surface of the second transparent plate. In addition, the heat dissipation member includes frame that extend toward between the side surfaces of the second substrate and the frame from both end sides of the frame portion.

20 Claims, 17 Drawing Sheets

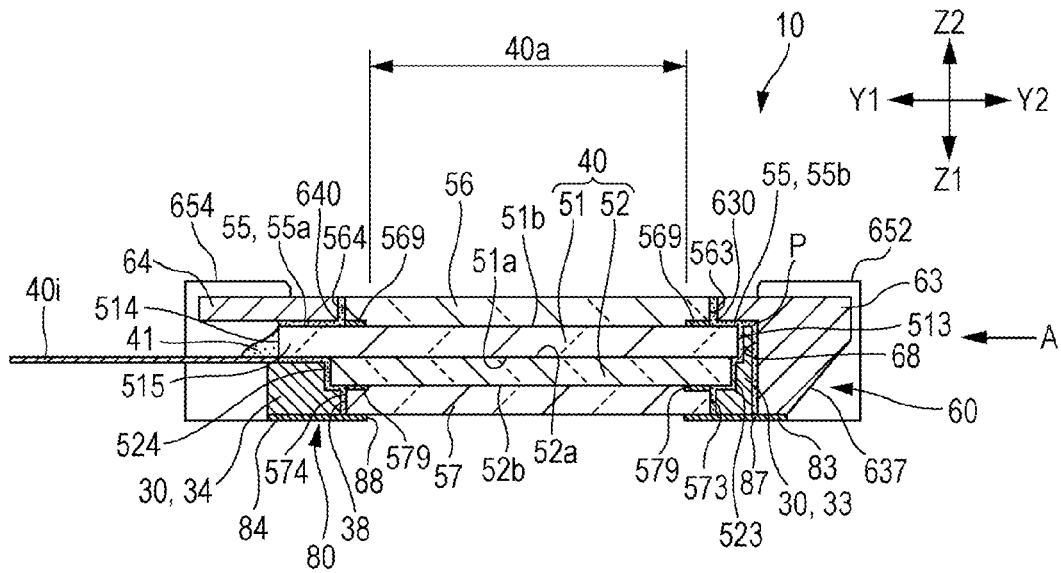
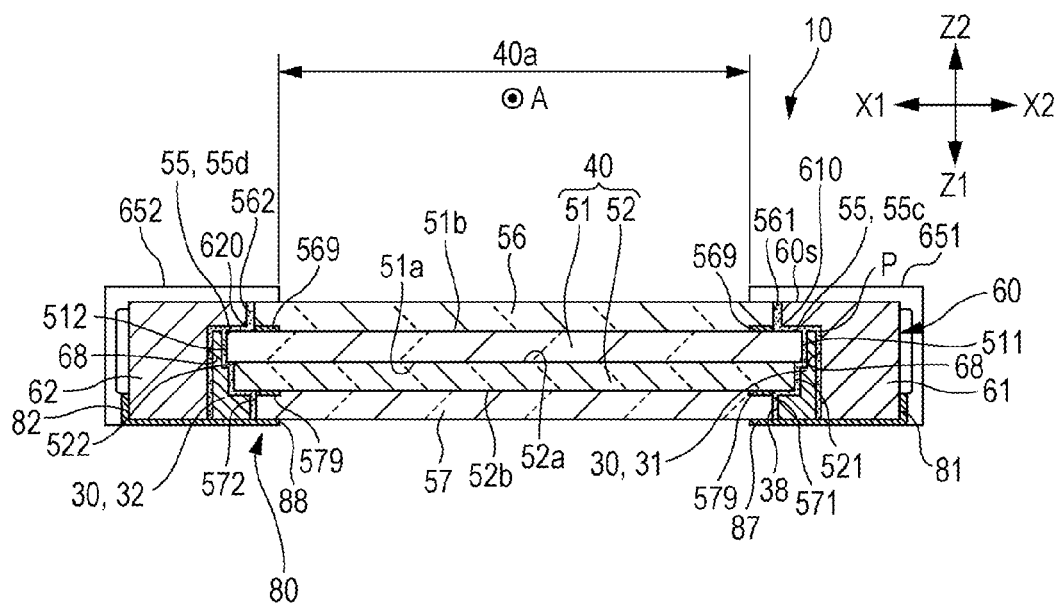

ELECTRO-OPTICAL MODULE WITH HEAT DISSIPATION MEMBER AND FRAME FOR HEAT RELEASE AND PROJECTION-TYPE DISPLAY APPARATUS

BACKGROUND

1. Technical Field

The present invention relates to an electro-optical module used in an electronic apparatus such as a projection-type display apparatus, and the projection-type display apparatus that includes the electro-optical module.

2. Related Art

When an image is displayed in an electronic apparatus such as a projection-type display apparatus, light is used which is modulated by an electro-optical panel such as a liquid crystal panel. The electro-optical panel has a configuration in which, for example, an electro-optical material layer such as a liquid crystal layer is provided between a first substrate and a second substrate. In addition, the first substrate includes a protrusion portion that protrudes from the second substrate, and on a surface of the protrusion portion of the second substrate side, a terminal to which a flexible wiring is connected is provided. In addition, the electro-optical panel is accommodated inside of the frame (frame body) and then, is mounted on the electronic apparatus as an electro-optical module (see JP-A-2005-196027).

In the electro-optical module, when the temperature of the electro-optical panel increases due to heat generation in the electro-optical panel itself or heat generation caused by incidence of a source light, a deterioration in the electro-optical material layer occurs.

Therefore, a configuration is proposed, in which a heat dissipation component made of metal is disposed between the first substrate and the frame (case) on the opposite side of the second substrate with respect to the first substrate (see JP-A-2004-194785).

In addition, a configuration is proposed, in which an electro-optical panel is held in the mounting case, and a heat dissipation member (a plate) that includes a fin on the opposite side of the first substrate with respect to the second substrate is disposed and the heat of the electro-optical panel is released to the heat dissipation member via the mounting case (see JP-A-2004-198933).

However, in the electro-optical module, a flexible wiring is connected to the second substrate side of the protrusion portion of the first substrate. Therefore, since it is not possible to dispose a frame on the second substrate with respect to the protrusion portion of the first substrate, in the configurations disclosed in JP-A-2005-196027 and JP-A-2004-194785, there is a problem in that the heat cannot be released to the frame from the side where the protrusion portion is positioned.

In the configuration disclosed in JP-A-2004-198933, the heat dissipation member is positioned on the second substrate side with respect to the protrusion portion of the first substrate, but the heat of the electro-optical panel is released to the heat dissipation member via the mounting case. For this reason, in the side surface adjacent to the side where the flexible wiring is positioned, since the heat dissipation member covers the mounting case from the outside, there is a problem in that the size of the electro-optical module increases.

SUMMARY

An advantage of some aspects of the invention is to provide an electro-optical module in which heat can be released with a high efficiency to a frame surrounding an electro-optical panel from an side where a protrusion portion on which a terminal is formed is positioned in a first substrate, and a projection-type display apparatus that includes the electro-optical module.

An electro-optical module according to an aspect of the invention includes: an electro-optical panel that includes a first substrate, a second substrate which is disposed so as to face the first substrate and an electro-optical material layer which is provided between the first substrate and second substrate, and in which a terminal is provided on the surface of a protrusion portion on the second substrate side protruding from the first substrate on the first side surface of the second substrate; a frame of which the thermal conductivity is higher than that of the first substrate and that of the second substrate, and that surrounds the side surface of the first substrate at a second side surface side adjacent to one end of the first side surface in the second substrate and at a third side surface side adjacent to the other end of the first side surface in the second substrate; and a heat dissipation member of which the thermal conductivity is higher than that of the first substrate and that of the second substrate, and that includes a first frame portion which faces the surface of the protrusion portion on the second substrate side and the first side surface, a second frame portion that extends toward between the second side surface and the frame from one end side of the first frame portion, and a third frame portion that extends toward between the third side surface and the frame from the other end side of the first frame portion.

The term "transparent" in the invention means that an object may have a light-transmitting property with respect to the light to be modulated or the light to be transmitted.

In this case, the frame surrounds the first substrate on the second side surface and the third side surface of the second substrate. However, the frame does not exist on the side surface of the first substrate on the side where the protrusion portion is positioned and at the position of the second substrate facing the first side surface. For this reason, the frame does not interfere when the wiring material such as the flexible wiring board which is connected to the terminal on the protrusion portion is pulled out. In addition, the first frame portion of the heat dissipation member is disposed so as to face the surface of the protrusion portion on the second substrate side and the first side surface of the second substrate and the second frame portion and the third frame portion of the heat dissipation member respectively extend toward between the second side surface and the frame, and between the third side surface and the frame. For this reason, the frame does not exist on the side surface of the first substrate on the side where the protrusion portion is positioned and at the position of the second substrate facing the first side surface. However, on the side where the protrusion portion is positioned, it is possible to release the heat generated by the electro-optical panel to the second frame portion and the third frame portion via the first frame portion of the heat dissipation member, and thereafter, further release to the frame. Therefore, it is possible to suppress the variation of the temperature or the increase of the temperature of the entire electro-optical panel without increasing the size of the electro-optical module. Accordingly, it is possible to suppress the deterioration of the electro-optical material layer caused by the increase of the temperature of the electro-optical panel.

It is preferable to adopt a configuration in which, on the second side surface side, the second frame portion faces the side surface of the first substrate, the second side surface, and the frame, and in which, on the third side surface side, the third frame portion faces the side surface of the first substrate, the third side surface, and the frame. According to the configuration, it is possible to release the heat of the electro-optical panel to the frame from the end portion of the first substrate and the end portion of the second substrate via the heat dissipation member.

It is preferable that an adhesive be interposed between the first side surface and the first frame portion, between the frame and the second frame portion, and between the frame and the third frame portion. According to the configuration, since an air layer is not interposed between the first side surface and the first frame portion, between the frame and the second frame portion, and between the frame and the third frame portion, it is possible to release the heat of the electro-optical panel to the first frame portion of the heat dissipation member from the side surface of the second substrate, and possible to release the heat to the frame from the second frame portion and the third frame portion of the heat dissipation member with a high efficiency.

It is preferable to adopt a configuration in which the frame surrounds a fourth side surface positioned on the opposite side across the second side surface and the third side surface with respect to the first side surface in the second substrate, and in which opposite side across the second substrate with respect to the first frame portion, the heat dissipation member includes a fourth frame portion that extends between the fourth side surface and the frame. According to the configuration, it is possible to release the heat of the electro-optical panel to the frame via the heat dissipation member with a high efficiency.

It is preferable that, in a plan view, the width of the first frame portion be larger than that of the second frame portion and that of the third frame portion. According to the configuration, it is possible to release the heat generated by the electro-optical panel to the heat dissipation member from the side where the protrusion portion is positioned with a high efficiency.

It is preferable that, a second substrate side transparent plate be disposed to be overlapped on the surface of the second substrate to the opposite side of the first substrate, in a state in which a part of the surface of the second substrate side protrudes, on the surface of the second substrate side of the second substrate side transparent plate, a light shielding layer that includes at least one of a metal or a metal compound be formed on the protrusion surface protruding from the second substrate, and on a part of the area of the second substrate side transparent plate overlapping the second substrate, and the heat dissipation member face the light shielding layer. According to the configuration, it is possible to release the heat of the electro-optical panel to the heat dissipation member via the light shielding layer. In addition, even in a case where the light shielding layer absorbs the light, it is possible to release the heat of the light shielding layer to the heat dissipation member.

It is preferable that a first substrate side transparent plate be disposed to be overlapped on the surface of the first substrate on the opposite side to the second substrate in a state in which a part of the surface of the first substrate on the second substrate side protrudes, and on the side surface of the first substrate side transparent plate and the surface of the first substrate on the first substrate side transparent plate side, the frame face the protrusion surface protruding from the first substrate side transparent plate. According to the configuration, it is possible to release the heat generated by the electro-optical panel to the frame from the protrusion surface protruding from the first substrate side transparent plate of the first substrate with a high efficiency.

It is preferable to adopt a configuration in which, a first substrate side transparent plate be disposed to be overlapped on the surface of the first substrate on the opposite side to the second substrate side in a state in which a part of the surface of the first substrate on the second substrate side protrudes, in which a plate that has thermal conductivity higher than that of the first substrate and the second substrate is disposed between the frame and the first substrate side transparent plate, and in which, on the side surface of the first substrate side transparent plate and on the surface of the first substrate on the first substrate side transparent plate side, the plate faces the protrusion surface protruding from the first substrate side transparent plate and the frame. According to the configuration, it is possible to release the heat generated by the electro-optical panel to the frame from the protrusion surface protruding from the first substrate side transparent plate of the first substrate via the heat dissipation member with a high efficiency.

It is preferable that the thermal conductivity of the heat dissipation member be higher than that of the frame. According to the configuration, it is possible to release the heat generated by the electro-optical panel to the frame via the heat dissipation member with a high efficiency.

It is preferable that a flexible wiring board be connected to the terminal, and an insulation member be provided on at least one of: between the flexible wiring board and the heat dissipation member and between the surface of the protrusion portion on the second substrate side and the protrusion surface protruding from the flexible wiring board.

It is preferable that the first substrate be an element substrate that includes a pixel electrode and a switching element provided corresponding to the pixel electrode. According to the configuration, it is possible to release the heat generated on the first substrate to the frame with a high efficiency.

In this case, the electro-optical panel is, for example, a liquid crystal panel that includes a liquid crystal layer as an electro-optical material layer.

It is effective that the invention may be applied to a case where the electro-optical module is used in a projection-type display apparatus. The projection-type display apparatus includes a light source portion that emits light which is supplied to the electro-optical module, and a projection optical system in which the light modulated by the electro-optical module is projected. In a case of the projection-type display apparatus, a strong light from the light source is incident on the electro-optical panel. However, according to an aspect of the invention, it is possible to suppress the increase of the temperature of the electro-optical panel.

It is preferable that the projection-type display apparatus include a cooling device that supplies cooling air to the electro-optical module. According to the configuration, it is possible to suppress the increase of the temperature of the electro-optical panel.

BRIEF DESCRIPTION OF THE DRAWINGS

The invention will be described with reference to the accompanying drawings, wherein like numbers reference like elements.

FIG. 9A and FIG. 9B are cross-sectional views of the electro-optical module in modification example 1 of Embodiment 1 of the invention.

DESCRIPTION OF EXEMPLARY EMBODIMENTS

Figure 1A:
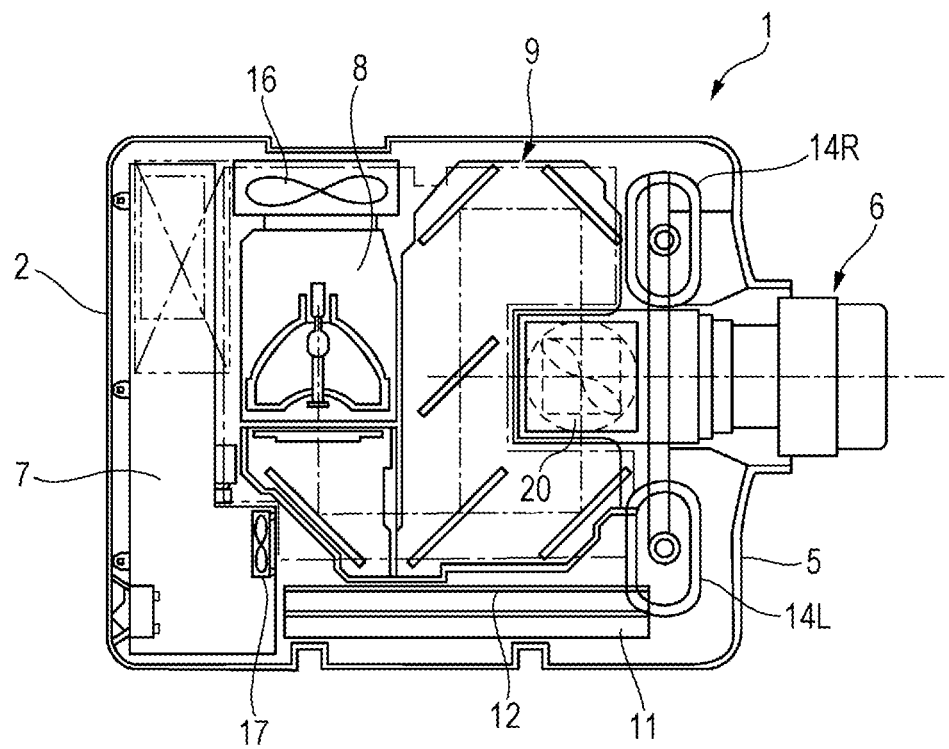
FIG. 1A and FIG. 1B are explanatory drawings of a projection-type display apparatus as an example of an electronic apparatus to which the invention is applied.

Embodiments of the invention will be described with reference to the drawings. In the description, as an electronic apparatus to which the invention is applied, a projection-type display apparatus in which an electro-optical module that includes a transmission-type electro-optical panel (a transmission-type liquid crystal panel) is used as a light bulb will be described. In addition, in the reference drawings for the description hereafter, in order to make sizes of each layer and each member in the drawings recognizable, the scale of each layer or each member is made to be different.

Embodiment 1

Overview of Projection-Type Display Apparatus (an Electronic Apparatus)

Figure 1B:
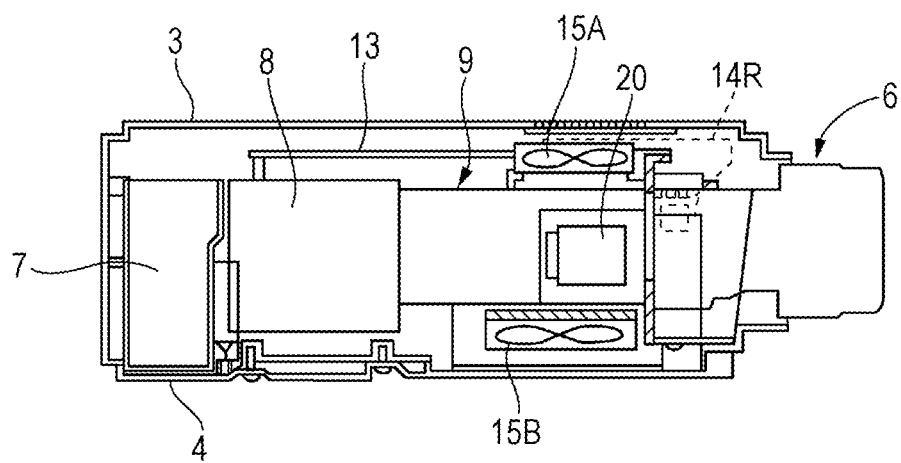
Figure 2:
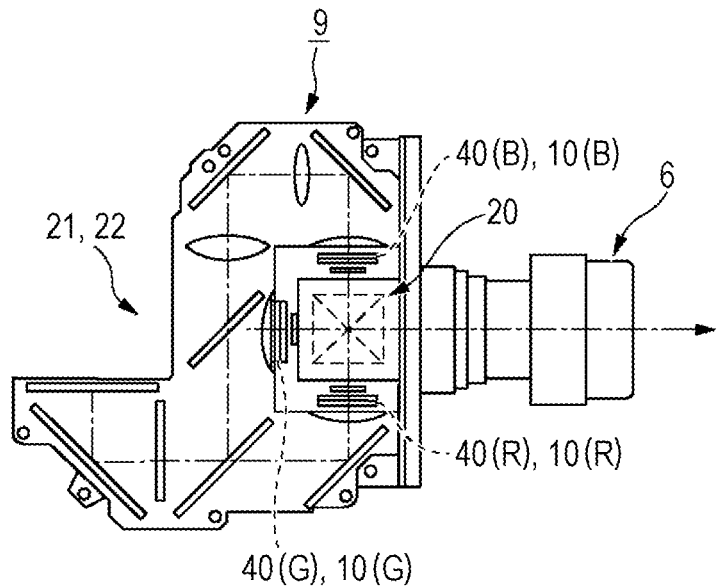
FIG. 2 is an explanatory drawing illustrating a configuration of an optical unit used in the projection-type display apparatus to which the invention is applied.

FIG. 1A and FIG. 1B are explanatory drawings of a projection-type display apparatus as an example of an electronic apparatus to which the invention is applied. FIG. 1A is an explanatory drawing illustrating a planar configuration of a main portion of the projection-type display apparatus, and FIG. 1B is an explanatory drawing illustrating the main portion seen from the side. FIG. 2 is an explanatory drawing illustrating a configuration of an optical unit used in the projection-type display apparatus to which the invention is applied.

In a projection-type display apparatus 1 illustrated in FIG. 1A and FIG. 1B, in an outer case 2, a power source unit 7 is disposed at the rear side thereof, and a light source lamp unit 8 (light source portion) and an optical unit 9 are disposed at the position adjacent to the power source unit 7 in the front side of the device. In addition, inside of the outer case 2, at the center of the front side of the optical unit 9, a base end side of a projection lens unit 6 is positioned. At one side of the optical unit 9, an interface substrate 11 on which an input-output interface circuit is mounted is disposed toward a front/rear direction of the apparatus, and a video substrate 12 on which a video signal processing circuit is mounted is disposed in a direction parallel to the interface substrate 11. At the upper side of the light source lamp unit 8 and the optical unit 9, a control substrate 13 for device drive control is disposed, and at each of the right and left corners of a front end side of the device, speakers 14R and 14L are disposed.

Above and below the optical unit 9, air intake fans 15A and 15B for cooling the inside of the device are disposed. In addition, at the side surface of the device which is the rear surface side of the light source lamp unit 8, an exhaust fan 16 is disposed. Furthermore, at a position opposing the end of the interface substrate 11 and the video substrate 12, an auxiliary cooling fan 17 for sucking the cooling air flow from the air intake fan 15A into the power source unit 7 is disposed. Among those fans, the air intake fan 15B functions as a cooling fan (a cooling device) with respect to an electro-optical panel 40 described below.

In FIG. 2, each optical element (element) that configures the optical unit 9 includes a prism unit 20 that configures color-light combining means and is supported by an upper light guide 21 or a lower light guide 22 made from metal such as magnesium or aluminum. The upper light guide 21 and the lower light guide 22 are fixed to an upper case 3 and a lower case 4 by fixing screws.

Detailed Configuration of Optical Unit 9

Figure 3:
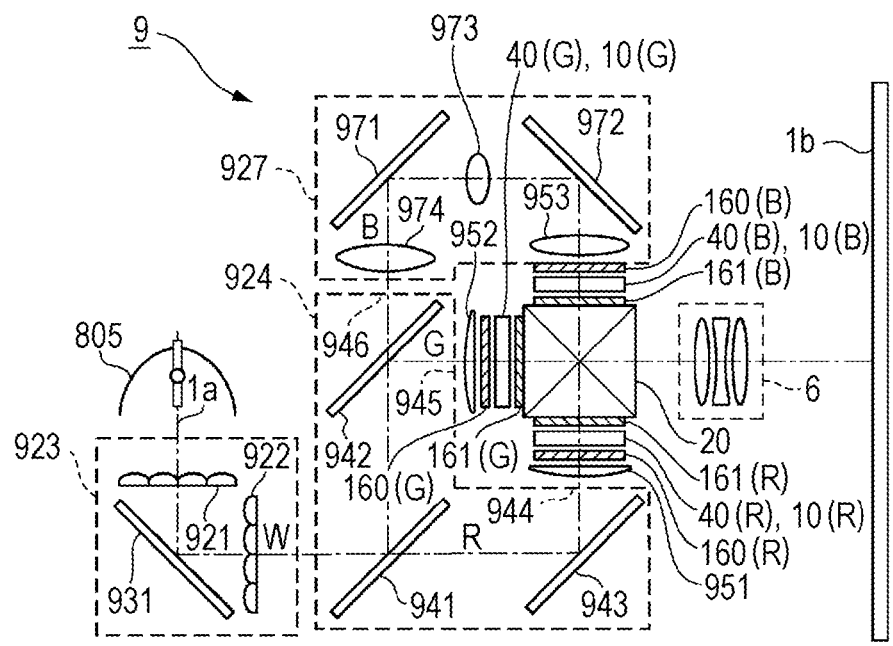
FIG. 3 is an explanatory drawing illustrating a detailed configuration of the electro-optical unit used in the projection-type display apparatus to which the invention is applied.

FIG. 3 is an explanatory drawing illustrating a detailed configuration of the electro-optical unit used in the projection-type display apparatus to which the invention is applied. As illustrated in FIG. 3, The optical unit 9 includes a light source lamp 805, an illumination optical system 923 that includes integrator lenses 921 and 922 which are uniform illumination optical elements, and a color light separation optical system 924 that separates a light flux W emitted from the illumination optical system 923 into each of the three colors of red, green, and blue light fluxes R, G, and B. In addition, the optical unit 9 includes three transmission-type electro-optical panels 40(R), 40(G), and 40(B) as electro-optical panels (light bulbs) that modulate each color light flux, the prism unit 20 as a color light synthesis optical system that synthesizes the modulated color light, and the projection lens unit 6 that enlarges and projects the synthesized light flux on a projection surface. In addition, the optical unit 9 includes a relay optical system 927 that performs guiding to the electro-optical panel 40(B) corresponding to the blue light flux B among each of the color light fluxes separated by the color light separation optical system 924.

The illumination optical system 923 further includes a reflection mirror 931 to cause a light axis 1a of the light emitted from the light source lamp 805 to bend to a direction perpendicular to the front direction of the device. The integrator lenses 921 and 922 are disposed in a state of being perpendicular to the front/rear in length of each other with the reflection mirror 931 interposed therebetween.

The color light separation optical system 924 is configured to include a blue-green reflection dichroic mirror 941, a green reflection dichroic mirror 942, and a reflection mirror 943. First, in the blue-green reflection dichroic mirror 941, from the light flux W passing through the illumination optical system 923, the blue light flux B and the green light flux G included therein are orthogonally reflected and travel toward the green reflection dichroic mirror 942 side. The red light flux R passes through the blue-green reflection dichroic mirror 941 and is perpendicularly reflected by the reflection mirror 943 at the rear side and emitted to the color light synthesis optical system side from a red light flux emitting portion 944. Next, in the green reflection dichroic mirror 942, among the blue and green light fluxes B and G reflected by the blue-green reflection dichroic mirror 941, only the green light flux G is orthogonally reflected and emitted to the color light synthesis optical system side from a green light flux emitting portion 945. The blue light flux B having passed through the green reflection dichroic mirror 942 is emitted to the relay optical system 927 side from the blue light flux emitting portion 946. In the present embodiment, all the distances from the light flux emitting portion of the illumination optical system 923 to each of the light flux emitting portions 944, 945, and 946 in the color light separation optical system 924 are set to be almost equal.

At the emitting side of the red light flux and green light flux emitting portions 944 and 945 in the color light separation optical system 924, condensing lenses 951 and 952 are disposed respectively. Therefore, the red light flux and the green light flux emitted from each emitting portion are incident on the condensing lenses 951 and 952 and parallelized.

Polarization directions of the parallelized red and green light fluxes R and G are aligned by polarizing plates 160(R) and 160(G), and then, are incident on the electro-optical panels 40(R) and 40(G), and are modulated for image information corresponding to each color light to be added. That is, the electro-optical panels 40(R) and 40(G) are switching controlled by an image signal corresponding to the image information by drive means (not illustrated), and thereby the modulation of each color light passing through the panels is performed. As the above-described drive means, well-known means can be used.

On the other hand, the blue light flux B passes through the relay optical system 927, and the polarization direction thereof is aligned by the polarizing plate 160(B), is guided to the corresponding electro-optical panel 40(B), and therein, similarly modulated according to the image information. The relay optical system 927 is configured to include a condensing lens 974, an incidence side reflection mirror 971, an emitting side reflection mirror 972, an intermediate lens 973 disposed between the above-described two mirrors, and a condensing lens 953 disposed at the front side of the electro-optical panel 40(B). In a length of light path of each color light flux, that is, a distance from the light source lamp 805 to each liquid crystal panel, the length of the light path of blue light flux B is the longest one. Therefore, an amount of optical loss of the blue light flux is the largest. However, the optical loss can be suppressed by interposing the relay optical system 927.

Each color light flux having passed through each electro-optical panel 40(R), 40(G), and 40(B) and modulated is respectively incident on each polarizing plate 161(R), 161(G), and 161(B), and the light having passed the polarizing plates is incident on the prism unit 20 (cross dichroic prism) so as to be synthesized. The color image synthesized here is enlarged and projected on a projection surface 1b such as a screen located at a predetermined position via the projection lens unit 6 that includes the projection lens system.

Configuration of Electro-Optical Panel 40

Figure 4A:
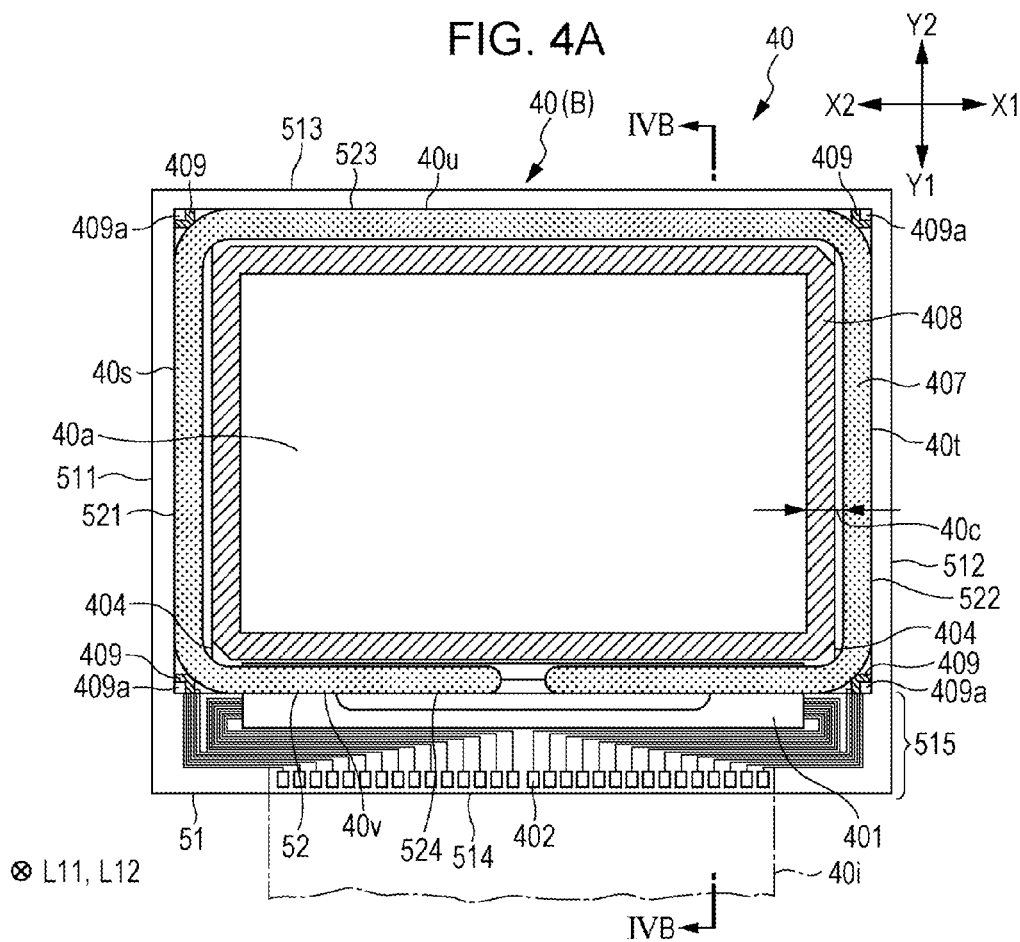
FIG. 4A and FIG. 4B are explanatory drawings of an electro-optical panel used in an electro-optical module to which the invention is applied.
Figure 4B:
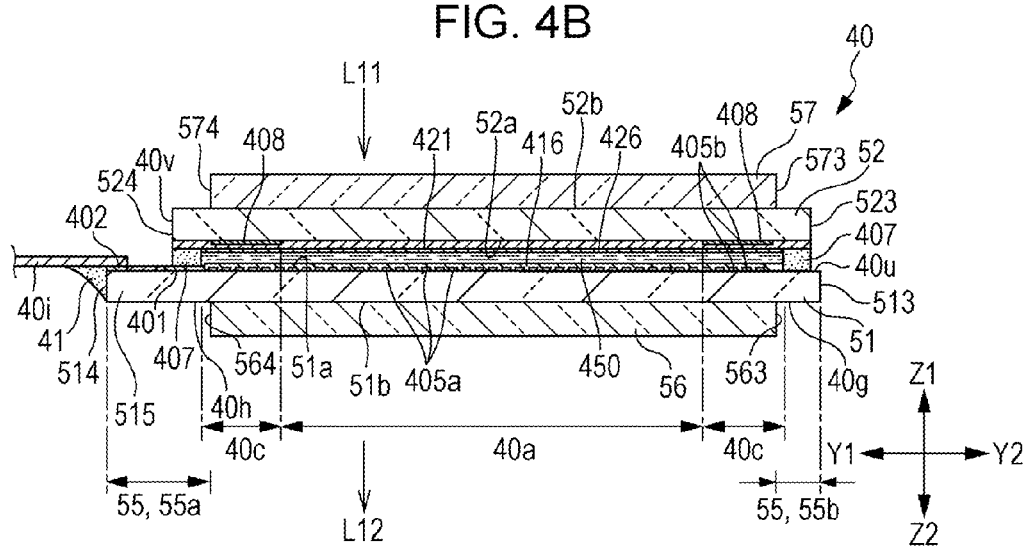

FIG. 4A and FIG. 4B are explanatory drawings of the electro-optical panel 40 used in the electro-optical module to which the invention is applied. FIG. 4A is a plan view seen from a second substrate side and illustrates each configuration component of the electro-optical panel 40. FIG. 4B is a cross-sectional view taken along the line IVB-IVB and illustrates each configuration component of the electro-optical panel 40.

In FIG. 4A and FIG. 4B to subsequent FIG. 5 to FIG. 8, a traveling direction of the source light is illustrated by an arrow L11, a traveling direction of the display light in which the source light is modulated by the electro-optical panel 40 is illustrated by an arrow L12, and the cooling air (cooling gas) supplied to the electro-optical panel 40 by the air intake fan 15B illustrated in FIG. 1B is illustrated by an arrow A. In addition, in the description hereafter, one of the directions crossing each other in the plane direction of the electro-optical panel 40 and the electro-optical module 10 is assumed to be an X-axis direction and the other direction thereof is assumed to be a Y-axis direction, and the direction crossing the X-axis direction and the Y-axis direction is assumed to be a Z-axis direction. In addition, in the drawings referred to below, one side (a side where the flexible wiring board 40i is provided) in the X-axis direction is illustrated as an X1 side, the other side as an X2 side, one side in the Y-axis direction as a Y1 side, the other side as a Y2 side, one side (a side where the source light is incident on) in the Z-axis direction as a Z1 side, and the other side (a side where the display light is emitted) as a Z2 side.

In the projection-type display apparatus 1 described with reference to FIG. 1A to FIG. 3, in mounting the electro-optical panels 40(R), 40(G), and 40(B) on the optical unit 9, each of the electro-optical panels 40(R), 40(G), and 40(B) are respectively mounted as electro-optical modules 10(R), 10(G), and 10(B) described below. The electro-optical panels 40(R), 40(G), and 40(B) have the same configurations and the electro-optical modules 10(R), 10(G), and 10(B) including the electro-optical panels 40(R), 40(G), and 40(B) also have the same configurations for red (R), green (G), blue (B). Therefore, in the description below, the electro-optical panels 40(R), 40(G), and 40(B) and the electro-optical modules 10(R), 10(G), and 10(B) will be described with omission of (R), (G), and (B) illustrating the corresponding colors.

As illustrated in FIG. 4A and FIG. 4B, in the electro-optical panel 40, a transparent first substrate 51 (element substrate) and a transparent second substrate 52 (opposing substrate) are adhered by a sealing material 407 via a predetermined gap. The first substrate 51 and the second substrate 52 are made from quartz or heat-resistant glass, and in the present embodiment, quartz is used for the first substrate 51 and the second substrate 52. In the present embodiment, the electro-optical panel 40 is a liquid crystal panel, and between the first substrate 51 and the second substrate 52, a liquid crystal layer as the electro-optical material layer 450 is held in the area surrounded by the sealing material 407. The sealing material 407 is provided in a frame shape along the outer edge of the second substrate 52. The sealing material 407 is a photo-curable adhesive, a thermosetting adhesive, or a both photo-curable and thermosetting adhesive, and a gap material such as glass fiber or glass beads is incorporated for making the distance between the two substrates be a predetermined value.

In the present embodiment, the first substrate 51 is a quadrangle, and includes four side surfaces 511, 512, 513, and 514 made from four sides of the quadrangle. The second substrate 52 also is a quadrangle similar to the first substrate 51, and includes four side surfaces 521, 522, 523, and 524 made from four sides of the quadrangle. At a substantial center of the electro-optical panel 40, an image display area 40a that emits the modulated light is provided as a quadrangular area. In response to the shape, the sealing material 407 also is provided in a quadrangle, and a peripheral area 40c having a quadrangular frame shape is provided between an inner peripheral edge of the sealing material 407 and an outer peripheral edge of the image display area 40a.

In the present embodiment, the size of the first substrate 51 is larger than that of the second substrate 52, the four side surfaces 511, 512, 513, and 514 of the first substrate 51 respectively protrude outward from the four side surfaces 521, 522, 523, and 524 of the second substrate 52. For this reason, around the second substrate 52, end portions 40s, 40t, 40u, and 40v are formed by the first substrate 51 and the four side surfaces 521, 522, 523, and 524 of the second substrate 52. In the end portions 40s, 40t, 40u, and 40v, the first substrate 51 is in a state of being exposed from the second substrate 52.

Pixels that include a transparent pixel electrode 405a and a pixel transistor (a switching element/not illustrated) corresponding to the pixel electrode 405a are formed on the image display area 40a of the first surface 51a opposing the second substrate 52 among a first surface 51a and a second surface 51b of the first substrate 51, in a matrix shape, and an opposing film 416 is formed on the upper layer side of the pixel electrode 405a. In addition, in the first surface 51a of the first substrate 51, a dummy pixel electrode 405b which is simultaneously formed with the pixel electrode 405a is formed in a peripheral area 40c. A configuration of the dummy pixel electrode 405b is adopted, in which the dummy pixel electrode 405b is electrically connected to the dummy pixel transistor, the dummy pixel electrode 405b is directly and electrically connected to a wiring without providing the dummy pixel transistor, or the dummy pixel electrode 405b is in a floating state to which an electric potential is not applied.

In addition, in the first substrate 51, the side surface 514 positioned at one side in the Y direction protrudes from the side surface 524 of the second substrate 52 more than the other side surfaces 511, 512, and 513, and on the surface (the first surface 51a) of the second substrate 52 side of the protrusion portion 515, a data line drive circuit 401 and a plurality of terminals 402 are formed along the side surface 514. In addition, on the first substrate 51, a scanning line drive circuit 404 is formed along the side surfaces 511 and 512. A flexible wiring board 40i is connected to the terminal 402, and various electric potentials or various signals are input to the first substrate 51 via the flexible wiring board 40i. In the first substrate 51, an adhesive for reinforcement 41 is applied across the side surface 514 and the flexible wiring board 40i.

A transparent common electrode 421 is formed on a first surface 52a opposing the first substrate 51 among a first surface 52a and a second surface 52b of the second substrate 52, and on the upper layer of the transparent common electrode 421, an alignment film 426 is formed. The common electrode 421 is formed on the substantially entire surface of the second substrate 52 or formed across a plurality of pixels as a plurality of strip-shaped electrodes. In the present embodiment, the common electrode 421 is formed on the substantially entire surface of the second substrate 52. In addition, on the first surface 52a of the second substrate 52, a light shielding layer 408 is formed on the lower layer side of the common electrode 421. In the present embodiment, the light shielding layer 408 is formed in a frame shape extending along the outer peripheral edge of the image display area 40a, and the image display area 40a is defined by the inner edge of the light shielding layer 408. The outer peripheral edge of the light shielding layer 408 is in a position across the gap from the inner peripheral edge of the sealing material 407, and the light shielding layer 408 and the sealing material 407 are not overlaying. In addition, in some cases, in the second substrate 52, in an area overlapping the area interposed by the adjacent pixel electrode 405a, a light shield layer which is formed simultaneously with the light shielding layer 408 is formed as a black matrix or a black stripe.

In the first substrate 51, an inter-substrate conduction electrode 409 that allows electrical conduction between the first substrate 51 and the second substrate 52 is formed in the area overlapping the corner portion of the second substrate 52 on the outer side of the sealing material 407. Between the inter-substrate conduction electrode 409 and the second substrate 52, an inter-substrate conduction material 409a including conductive particles is disposed, and the common electrode 421 of the second substrate 52 is electrically connected to the first substrate 51 side via the inter-substrate conduction material 409a and the inter-substrate conduction electrode 409. For this reason, a common electric potential is applied to the common electrode 421 from the first substrate 51 side. The sealing material 407 is disposed along the outer peripheral edge of the second substrate 52 with substantially the same size. However, the sealing material 407 is provided so as to pass through the inward side from the area overlapping the corner portion of the second substrate 52 avoiding the inter-substrate conduction electrode 409.

In the electro-optical panel 40, in the present embodiment, since the pixel electrode 405a and the common electrode 421 are formed of a transparent conduction film such as an ITO film, the electro-optical panel 40 is a transmission type liquid crystal panel. In a case of the transmission type liquid crystal panel (the electro-optical panel 40), the light incident from one of the first substrate 51 or the second substrate 52 is modulated while the light passes through and is emitted from the other substrate. In the configuration in the present embodiment, the light incident from the second substrate 52 (illustrated by an arrow L11) passes through the first substrate 51 and is emitted as the modulated light (illustrated by an arrow L12). For this reason, the second substrate 52 is disposed on the one side Z1 in the Z-axis direction and the first substrate 51 is disposed on the other side Z2 in the Z direction. If the common electrode 421 is formed of the transparent conduction film and the pixel electrode 405a is formed of reflective conduction film, it is possible to configure a reflection type liquid crystal panel. In a case of the reflection type liquid crystal panel, the light incident from the second substrate 52 side is modulated while the light is reflected and is emitted from the first substrate 51. Since the electro-optical panel 40 in the present embodiment is used as a light bulb in the projection-type display apparatus (the liquid crystal projector), the color filter is not formed. However, in a case where the electro-optical panel 40 is used as a direct-view type display device of an electronic apparatus such as a mobile computer or a mobile phone, the color filter is formed on the second substrate 52.

Overall Configuration of Electro-Optical Module 10

Figure 5:
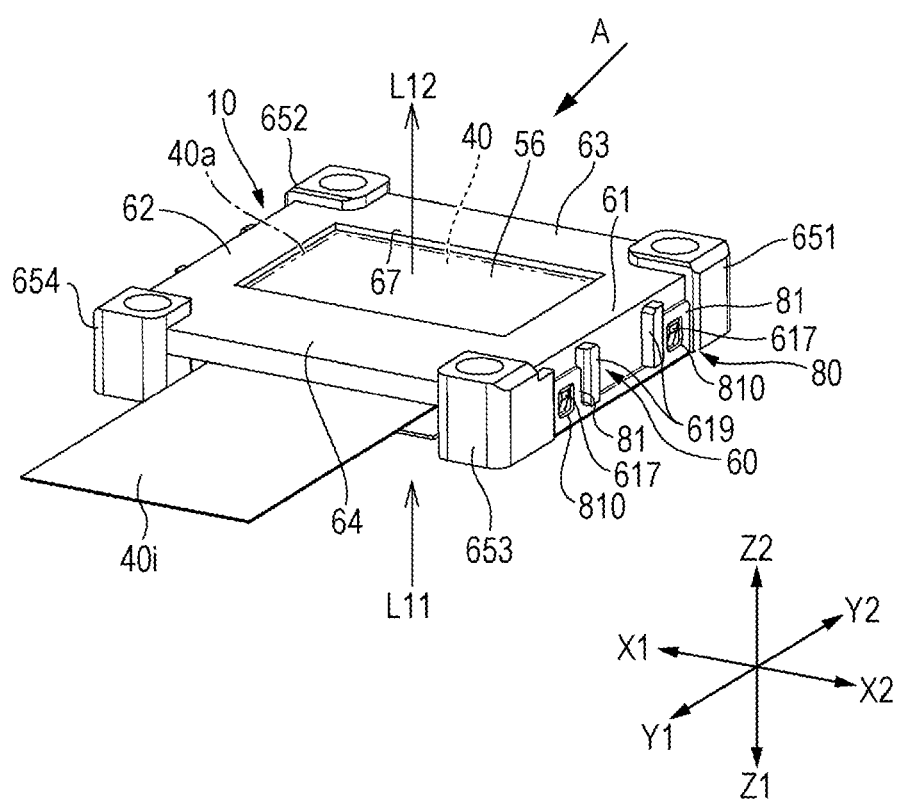
FIG. 5 is a perspective view of the electro-optical module in Embodiment 1 of the invention seen from a light emitting side.
Figure 6A:
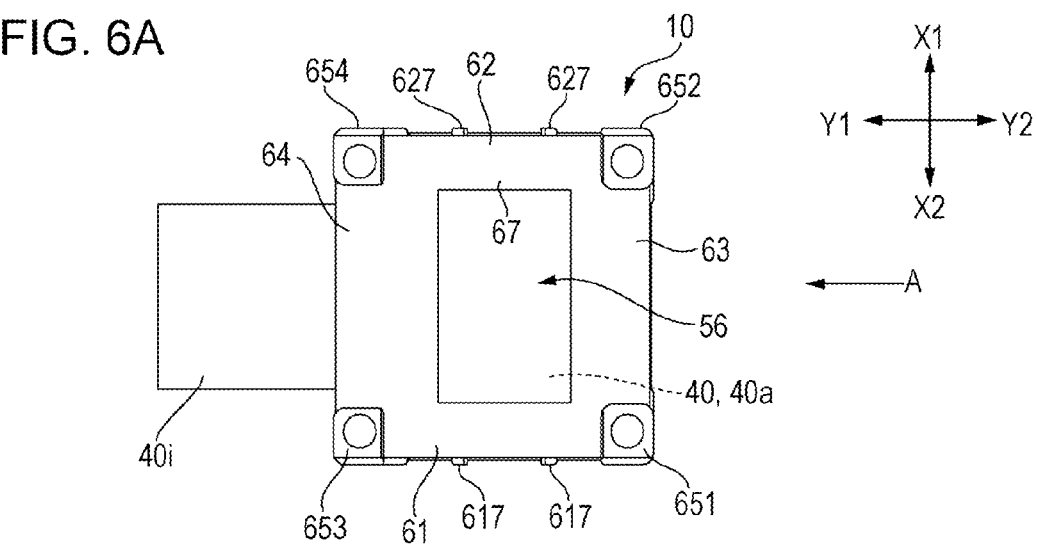
FIG. 6A, FIG. 6B, and FIG. 6C are explanatory drawings of the electro-optical module in Embodiment 1 of the invention.
Figure 6B:
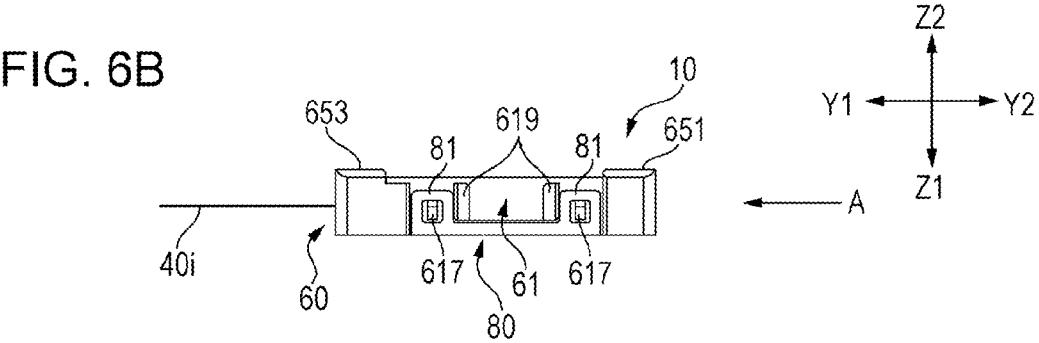
Figure 6C:
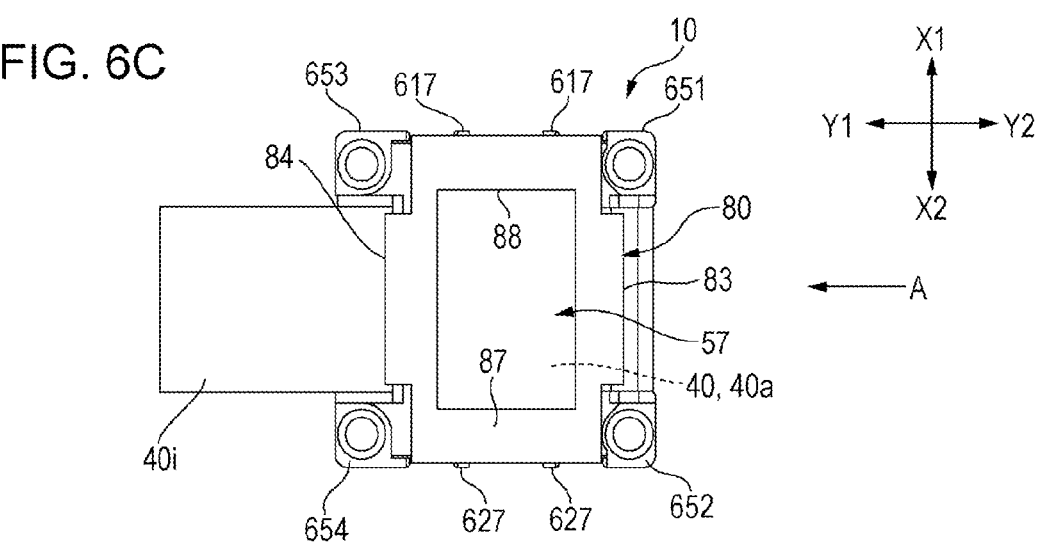
Figure 7A:
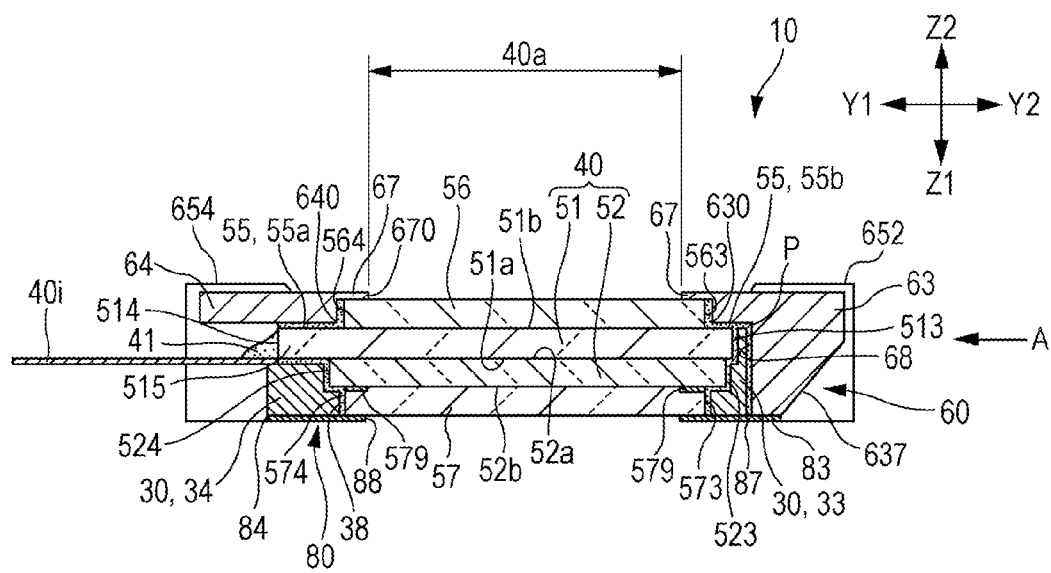
FIG. 7A and FIG. 7B are cross-sectional views of the electro-optical module in Embodiment 1 of the invention.
Figure 7B:
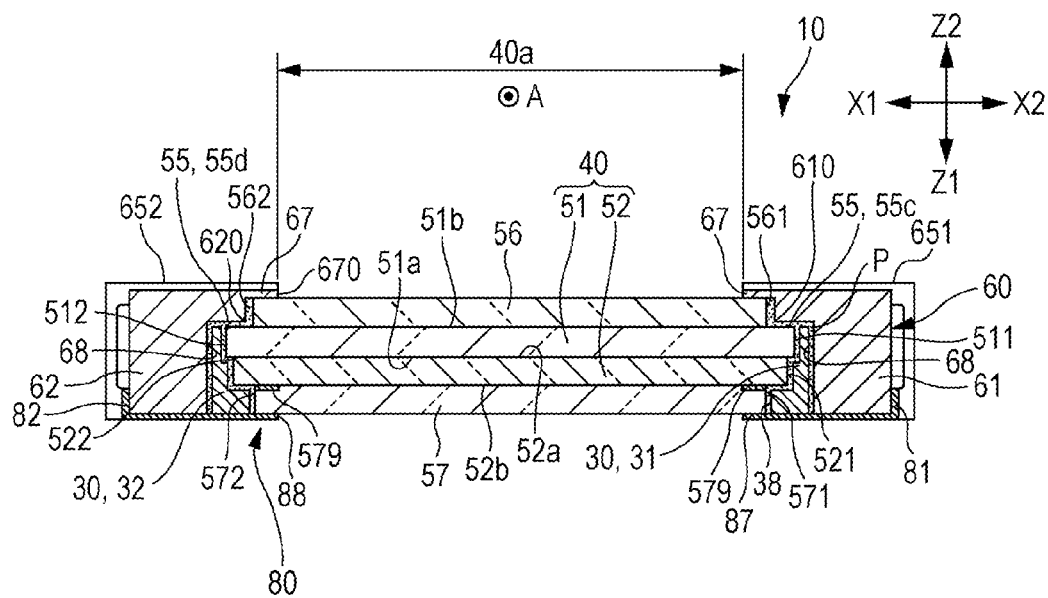
Figure 8:
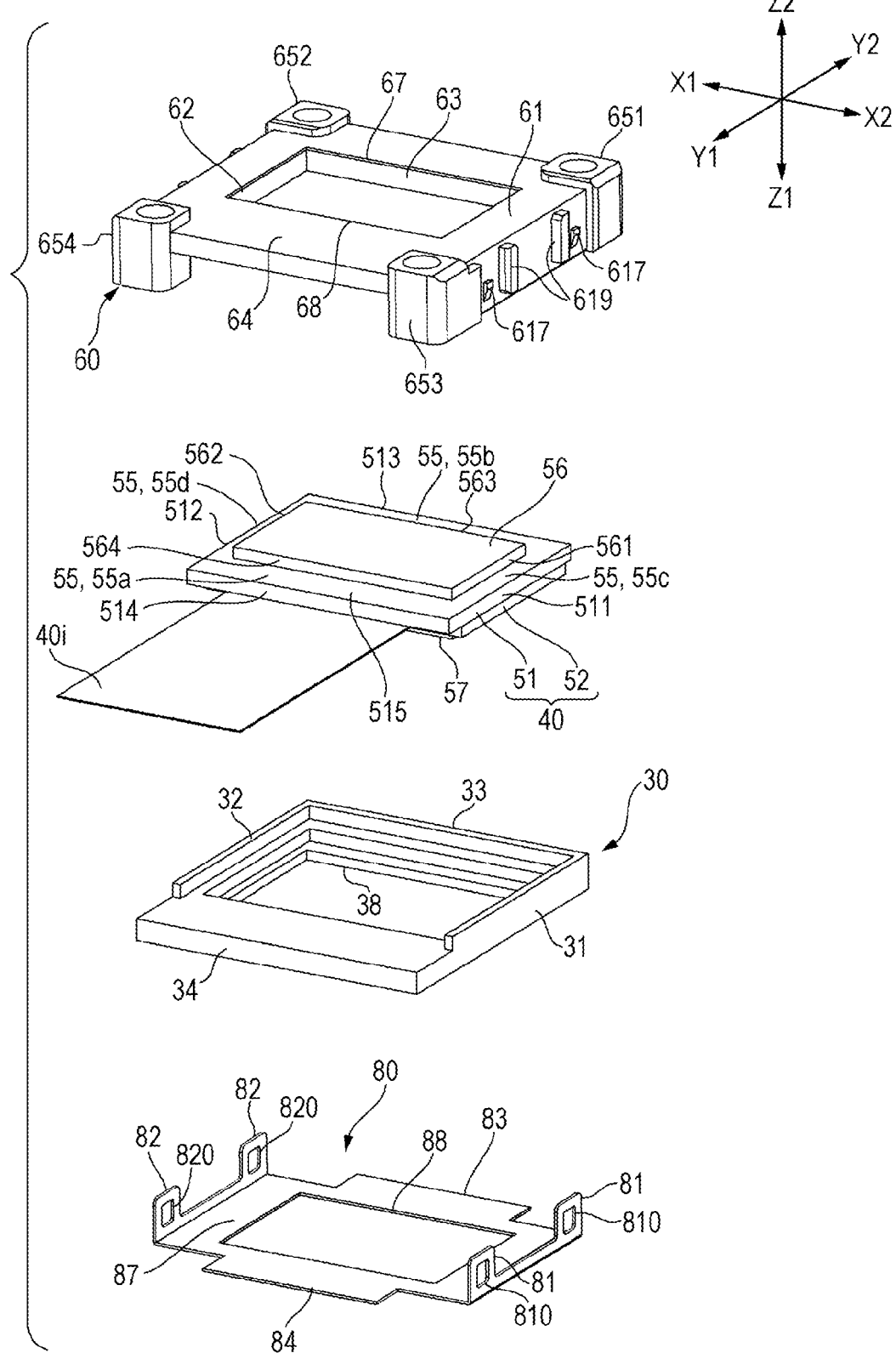
FIG. 8 is an exploded perspective view of the exploded electro-optical module in Embodiment 1 of the invention seen from the light emitting side.

FIG. 5 is a perspective view of the electro-optical module in Embodiment 1 of the invention seen from the light emitting side. FIG. 6A, FIG. 6B, and FIG. 6C are explanatory drawings of the electro-optical module in Embodiment 1 of the invention. FIG. 6A is a plan view of the electro-optical module seen from the light emitting side, FIG. 6B is a side view seen from the other side X2 in the X-axis direction, and FIG. 6C is a bottom view seen from the light incident side. FIG. 7A and FIG. 7B are cross-sectional views of the electro-optical module in Embodiment 1 of the invention. FIG. 7A is a cross-sectional view of the electro-optical module taken from the YZ plane and FIG. 7B is a cross-sectional view taken from the XZ plane. FIG. 8 is an exploded perspective view of the exploded electro-optical module in Embodiment 1 of the invention seen from the light emitting side.

In the description hereinafter, "a first, second, third, and fourth side surfaces of a second substrate" and "the side surfaces 521 to 524 of the second substrate 52 illustrated in FIG. 4A and FIG. 4B" in the invention have a relationship as follows. "The first side surface of the second substrate"=the side surface 524 of the second substrate 52, "the second side surface of the second substrate"=the side surface 521 of the second substrate 52, "the third side surface of the second substrate"=the side surface 522 of the second substrate 52, and "the fourth side surface of the second substrate"=the side surface 523 of the second substrate 52.

As illustrated in FIG. 5A to FIG. 8, in mounting the electro-optical panel 40 on the optical unit 9 of the projection-type display apparatus 1, for the purpose of reinforcement, the electro-optical panel 40 is the electro-optical module 10 held by the frame 60. In the electro-optical module 10 in the embodiment, in addition to the electro-optical panel 40 and the frame 60, a first transparent plate 56, a second transparent plate 57, a light shielding plate 80 of the incident side, and a heat dissipation member 30 are used. Hereinafter, a detailed configuration of the electro-optical module 10 will be described with reference to mainly FIG. 7A and FIG. 7B. Configuration of the first transparent plate 56 and the second transparent plate 57

As illustrated in FIG. 4B, FIG. 7A, FIG. 7B and the like, in the present embodiment, in configuring the electro-optical module 10 using the electro-optical panel 40, on the second surface 51b of the first substrate 51 (outer surface/the surface of the first substrate 51 opposite to the second substrate 52), the first transparent plate 56 (the first substrate side transparent plate) is adhered by an adhesive or the like, and on the second surface 52b of the second substrate 52 (outer surface/the surface of the second substrate 52 opposite to the first substrate 51), the second transparent plate 57 (the second substrate side transparent plate) is adhered by an adhesive or the like. Each of the first transparent plate 56 and the second transparent plate 57 is configured as dust-proof glass, and dust or the like is prevented from sticking on the outer surface of the first substrate 51 (the second surface 51b) and the outer surface of the second substrate 52 (the second surface 52b). For this reason, even though the dust may stick to the electro-optical panel 40, the dust is separated from the electro-optical material layer 450. Therefore, in the projection-type display apparatus 1 described with reference to FIG. 1A and FIG. 1B or the like, since the dust is in a defocused state, it is possible to prevent the dust from being projected as an image in the projected image. Quartz or heat-resistant glass is used in the first transparent plate 56 and the second transparent plate 57. In the present embodiment, similarly to the first substrate 51 and the second substrate 52, quartz is used in the first transparent plate 56 and the second transparent plate 57, and the thickness thereof is 1.1 to 1.2 mm.

Here, the first transparent plate 56 is configured so as to overlap at least the image display area 40a of the electro-optical panel 40 in a state that a part of the second surface 51b of the first substrate 51 is exposed. Specifically, the first transparent plate 56 has a rectangular shape and is smaller than the first substrate 51 in size, and, in a plan view, each of the side surfaces 561, 562, 563, and 564 of the first transparent plate 56 are positioned on the inward side from the side surfaces 511, 512, 513, and 514 of the first substrate 51 in the entire circumference of the first transparent plate 56. For this reason, in a plan view, each of the side surfaces 561, 562, 563, and 564 of the first transparent plate 56 are positioned between the side surfaces 511, 512, 513, and 514 of the first substrate 51 and the end portion of the image display area 40a, and around the first transparent plate 56, step portions 40e to 40h are configured with the side surfaces 561, 562, 563, and 564 of the first transparent plate 56 and the second surface 51b of the first substrate 51. Therefore, in the second surface 51b of the first substrate 51, a protrusion surface 55 protruding from the first transparent plate 56 is formed so as to surround the entire circumference of the first transparent plate 56. In the protrusion surface 55, a protrusion surface 55a in a side where the side surface 514 (the protrusion portion 515) is positioned is assumed to be a first protrusion surface, and a protrusion surface 55b in the opposite side (the side where the side surface 513 is positioned) interposing the first transparent plate 56 with respect to the protrusion surface 55a is assumed to be a second protrusion surface. In addition, a protrusion surface 55c and 55d (the protrusion surface 55 at the side where the side surfaces 511 and 512 are positioned) which is positioned between the protrusion surface 55a and protrusion surface 55b is assumed to be a third protrusion surface.

The second transparent plate 57 is configured so as to overlap at least the image display area 40a of the electro-optical panel 40 in a state that a part of the second surface 52b of the second substrate 52 is exposed. Specifically, the second transparent plate 57 has a rectangular shape with a size substantially the same as the first transparent plate 56, and is smaller than the second substrate 52 in size. For this reason, each of the side surfaces 571, 572, 573, and 574 of the second transparent plate 57 are positioned on the inward side from the side surfaces 521, 522, 523, and 524 of the second substrate 52 all around the second transparent plate 57, and are positioned between the side surfaces 521, 522, 523, and 524 of the second substrate 52 and the end portion of the image display area 40a. Therefore, around the second transparent plate 57, step portions are configured with the side surfaces 571, 572, 573, and 574 of the second transparent plate 57 and the second surface 52b of the second substrate 52. In addition, in the second surface 52b of the second substrate 52, a protrusion surface protruding from the second transparent plate 57 is formed so as to surround the entire circumference of the second transparent plate 57. Configuration of Frame 60

In the present embodiment, the frame 60 is a rectangular frame-shaped resin member or a metal member that includes a rectangular opening portion 68 at the center, and in plan view, includes four frame portions 61, 62, 63, and 64 that surround the first transparent plate 56, the electro-optical panel 40, and the second transparent plate 57. In the frame portions 61, 62, 63, and 64, connecting portions of each of the adjacent frame portions (corner portions) are prismshaped connecting portions 651, 652, 653, and 654. Thermal conductivity of the frame 60 is higher than that of the first substrate 51, the second substrate 52, the first transparent plate 56, and the second transparent plate 57. For example, the frame 60 is a molded article provided with a metal layer on the surface of the resin member, or is a metal member of aluminum, copper, or iron. In the present embodiment, the frame 60 is a metal member made from aluminum or the like.

In the frame 60, the frame portion 61 faces the side surface 561 of the first transparent plate 56, the side surface of the electro-optical panel 40, and the side surface 571 of the second transparent plate 57. The frame portion 62 faces the side surface 562 of the first transparent plate 56, the side surface of the electro-optical panel 40, and the side surface 572 of the second transparent plate 57. The frame portion 63 faces the side surface 563 of the first transparent plate 56, the side surface of the electro-optical panel 40, and the side surface 573 of the second transparent plate 57. On the other hand, the frame portion 64 is formed in a plane plate shape extending along the protrusion portion 515 on the other side Z2 in the Z-axis direction with respect to the protrusion portion 515 of the first substrate 51, and is not configured to face the electro-optical panel 40 on one side in the Y-axis direction. Therefore, the frame 60 is accommodated inside of the first transparent plate 56, the electro-optical panel 40, and the second transparent plate 57 by the frame portions 61, 62, and 63. In addition, since the frame portion 64 is formed in a plane plate shape extending along the protrusion portion 515 of the first substrate 51, it is possible to pull out the flexible wiring board 40$i$ to the outside of the frame 60 so as to extend toward one side in the Y-axis direction along the direction inside of the surface of the electro-optical panel 40.

In the inner side surface of four frame portions 61, 62, 63, and 64, the protrusion surface 55 protruding from the first transparent plate 56 of the first substrate 51 and external corner-shaped corner portions 610, 620, 630, and 640 that are bent along the side surfaces 561, 562, 563, and 564 of the first transparent plate 56, are formed. For this reason, the frame 60 faces the protrusion surface 55 protruding from the first transparent plate 56 of the first substrate 51 and the side surfaces 561, 562, 563, and 564 of the first transparent plate 56 by the corner portions 610, 620, 630, and 640. In addition, in the inner side surface of the frame portions 61, 62, and 63, a part that forms the corner portions 610, 620, and 630 protrudes to the inward side and extends from the protruding part in a straight line shape toward the one side Z1 in the Z-axis direction. As a result, when assembling the electro-optical module 10, the first transparent plate 56 side of the first substrate 51 leads the one side Z1 of the frame 60 in the Z-axis direction, and thus it is possible to provide the electro-optical panel 40 in the inside of the frame 60. On the one side Z1 of the frame portion 63 in the Z-axis direction, the end portion of the other side Y2 in the Y-axis direction is a tapered surface 637, and as illustrated by an arrow A, when the cooling air is supplied to the electro-optical module 10 by the air intake fan 15B illustrated in FIG. 1B, the cooling air is guided with a high efficiency to the one side Z1 of the electro-optical module 10 in the Z-axis direction. In addition, when the cooling air is supplied to the electro-optical module 10, the cooling air is also guided to the other side Z2 of the electro-optical module 10 in the Z-axis direction.

In the present embodiment, the width measurement of the protrusion surface 55 and the area of the overlapping surface of the protrusion surface 55 and the frame 60 has the relationships as follows: protrusion surfaces 55$c$ and 55$d$ ≅protrusion surface 55$b$<protrusion surface 55$a$. That is, in the first substrate 51, in the protrusion surface 55$a$ (the first protrusion surface 55$a$) side where the protrusion portion 515 to which the flexible wiring board 40$i$ is connected is positioned, the overlapping width with the frame 60 is larger than that in the protrusion surface 55$b$ (the second protrusion surface) which is positioned at the opposite side to the protrusion surface 55$a$ across the first transparent plate 56.

In addition, in the frame 60, a plate-shaped light shielding portion 67 protrudes to the inside from the end portion of the other side Z2 in the Z-axis direction of the frame portions 61, 62, 63, and 64, and the plate-shaped light shielding portion 67 overlaps the surface opposite to the side where the electro-optical panel 40 is positioned in the first transparent plate 56. In addition, in the plate-shaped light shielding portion 67, an opening portion 670 is formed in the area where the plate-shaped light shielding portion 67 overlaps the image display area 40$a$ of the electro-optical panel 40, and the plate-shaped light shielding portion 67 functions as a boarder portion of the emitting side with respect to the electro-optical panel 40. Here, the thickness of the plate-shaped light shielding portion 67 is quite small compared to that of the frame portions 61, 62, 63, and 64 (thickness in the Z direction). In the frame 60, a blackening treatment is applied by painting or the like on the surface toward the other side Z2 in the Z-axis direction.

Configuration of the Light Shielding Plate 80 in the Incident Side

In the light incident side (one side Z1 in the Z-axis direction) with respect to the frame 60, the plate-shaped light shielding plate 80 formed of a metal plate or a resin plate is disposed overlappingly. In the present embodiment, the light shielding plate 80 is formed of a metal plate. The light shielding plate 80 includes a rectangular end plate portion 87 that overlaps in the light incident side with respect to the frame 60, and in the end plate portion 87, an opening portion 88 that overlaps the image display area 40$a$ of the electro-optical panel 40. The opening portion 88 is smaller than the opening portion 68 of the frame 60, and the end plate portion 87 protrudes to the inside of the opening portion 68 around the entire opening portion 68. For this reason, the end plate portion 87 of the light shielding plate 80 functions as an end part portion that limits the range in which the light is incident on the electro-optical panel 40.

The light shielding plate 80 includes side plate portions 81, 82, 83, and 84 which extend from the outer edge of the end plate portion 87. Among those side plate portions 81, 82, 83, and 84, the side plate portions 81 and 82 which position on both sides in the X direction are bent at a substantially right angle toward the other side Z2 in the Z-axis direction from the end portion of the end plate portion 87 so as to overlap the outer side surface of the frame portions 61 and 62. In the present embodiment, the side plate portions 81 and 82 are provided at two separate places, and engagement holes 810 and 820 are formed in each of the two side plate portions 81 and 82. On the other hand, on the outer side surface of the frame portions 61 and 62 of the frame 60, protrusions 617 and 627 that fit in each of the engagement holes 810 and 820 are formed. Therefore, the light shielding plate 80 is coupled to the frame 60 and integrated to the frame 60 by the side plate portions 81 and 82 provided so as to interpose the frame 60 from both sides being coupled to the outer side surface of the frame 60. In this state, in the inside of the frame 60, a panel accommodation portion which has the end plate portion 87 of the light shielding plate 80 as a bottom portion is configured, and in the panel accommodation portion, the electro-optical panel 40 on which the first transparent plate 56 and the second transparent plate 57 are adhered is accommodated. Here, on the outer side surface of the frame portions 61 and 62, protrusions 619 and 629 are formed on the side of the protrusions 617 and 627, and the protrusions 619 and 629 are used for the position determination of the side plate portions 81 and 82.

In the present embodiment, a light shielding layer 579 is provided in the area where the end plate portion 87 overlaps the second transparent plate 57, and the forming a boarder for the incident side is performed by the light shielding layer 579 and the light shielding plate 80. In the present embodiment, the light shielding layer 579 is made by laminating a chromium layer (metal layer/light reflection layer) and a chromium oxide layer (metal compound layer/light absorbing layer) from the second transparent plate 57 side.

Configuration of the Heat Dissipation Member 30

In the present embodiment, in order to improve the heat dissipation from the electro-optical panel 40 (the first substrate 51 and the second substrate 52) to the frame 60, inside of the frame 60, the rectangular frame-shaped heat dissipation member 30 is disposed around the electro-optical panel 40 and the second transparent plate 57, and the heat dissipation member 30 overlaps the surface of the light shielding plate 80 side where the electro-optical panel 40 is positioned. In the present embodiment, the heat dissipation member 30 is a member made of metal such as aluminum, copper, or iron, and the thermal conductivity thereof is higher than the first substrate 51 and second substrate 52.

Here, the heat dissipation member 30 includes a frame portion 31 that is positioned between the electro-optical panel 40 and the frame portion 61 of the frame 60, a frame portion 32 that is positioned between the electro-optical panel 40 and the frame portion 62 of the frame 60, and a frame portion 33 that is positioned between the electro-optical panel 40 and the frame portion 63 of the frame 60. Here, in one side Y1 in the Y-axis direction, the frame portion 64 of the frame 60 does not face the electro-optical panel 40 on the one side Y1 in the Y-axis direction, and the heat dissipation member 30 is not disposed between the electro-optical panel 40 and the frame portion 64 of the frame 60. However, the in the heat dissipation member 30, the frame portion 34 that faces the protrusion portion 515 of the first substrate 51 is formed on the one side Z1 in the Z-axis direction, and the frame portion 34 faces the side surface 524 of the second substrate 52 on the one side Y1 in the Y-axis direction. Therefore, the heat dissipation member 30 includes the frame portion 34, the frame portion 31 that extends between the side surface 521 of the second substrate 52 and the frame 60 from one end side of the frame portion 34, the frame portion 32 that extends between the side surface 522 of the second substrate 52 and the frame 60 from one end side of the frame portion 34, and the frame portion 33 that extends between the second substrate 52 and the frame 60 at the position facing the frame portion 34. In the present embodiment, when the heat dissipation member 30 is viewed in the plan view, the width of the frame portion 34 is larger than that of the frame portions 31 and 32.

"A first frame portion, a second frame portion, a third frame portion, and a fourth frame portion of the heat dissipation member" and the frame portions 31, 32, 33, and 34 of the heat dissipation member 30 have relationships as follows. The first frame portion of the heat dissipation member=the frame portion 34 of the heat dissipation member 30. The second frame portion of the heat dissipation member=the frame portion 31 of the heat dissipation member 30. The third frame portion of the heat dissipation member=the frame portion 32 of the heat dissipation member 30. The fourth frame portion of the heat dissipation member=the frame portion 33 of the heat dissipation member 30.

In the heat dissipation member 30, the outer side surface of the frame portions 31, 32, and 33 facing the frame portions 61, 62, and 63 of the frame 60 extends in the Z-axis direction in a straight line shape. On the other hand, the inner side surfaces of the frame portions 31, 32, and 33 have a multi-stage shape bent along the outer shape of the electro-optical panel 40 and the second transparent plate 57. For this reason, the inner side surface of the frame portions 31, 32, and 33 faces the side surfaces 511, 512, and 513 of the first substrate 51, the protrusion surface protruding from the second substrate 52 of the first surface 51a of the first substrate 51, the side surfaces 521, 522, and 523 of the second substrate 52, the protrusion surface protruding from the second transparent plate 57 of the second surface 52b of the second substrate 52, and the side surfaces 571, 572, and 573 of the second transparent plate 57. In addition, the end portion on the other side Z2 of the frame portions 31, 32, and 33 in the Z-axis direction faces near the corner portions 610, 620, and 630 of the frame 60, and the end portion on the one side Z1 of the frame portions 31, 32, and 33 in the Z-axis direction faces the light shielding plate 80. The adhesive P is interposed between the frame portions 31, 32, and 33, and the frame 60, the electro-optical panel 40 and the second transparent plate 57.

In addition, the inner side surface of the frame portion 34 has a step shape bent along the external shape of the second substrate 52 and the second transparent plate 57. For this reason, the inner side surface of the frame portion 34 faces the side surface 524 of the second substrate 52, the protrusion surface protruding from the second transparent plate 57 of the second surface 52b of the second substrate 52, and the side surface 574 of the second transparent plate 57. In addition, the end surface of the other side Z2 of the frame portion 34 in the Z-axis direction faces the first surface 51a (the protrusion portion 515) of the first substrate 51 across the gap (air layer), and the end portion of the one side Z1 of the frame portion 34 in the Z-axis direction faces the light shielding plate 80. The adhesive P is interposed between the frame portion 34 and the second substrate 52 and the second transparent plate 57.

In the present embodiment, the flexible wiring board 40i and the frame portion 34 of the heat dissipation member 30 face each other, and in the protrusion portion 515, a part exposed from the flexible wiring board 40i and the frame portion 34 of the heat dissipation member 30 face each other. For this reason, it is preferable to prevent a short circuit between the flexible wiring board 40i and the heat dissipation member 30 by a configuration in which the flexible wiring board 40i is curved on the side opposite to the heat dissipation member 30 or by disposing an insulation material such as a coating layer between the flexible wiring board 40i and the frame portion 34 of the heat dissipation member 30. In addition, it is preferable to prevent a short circuit with the conductive layer such as the wiring formed on the protrusion portion 515 by disposing an insulation material such as a coating layer between the part exposed from the flexible wiring board 40i in the protrusion portion 515 and the frame portion 34 of the heat dissipation member 30.

Structure Fixed with Adhesive

In the electro-optical module 10 configured in this way, the adhesive P is interposed between the first transparent plate 56 and the frame 60, between the electro-optical panel 40 and the frame 60, between the electro-optical panel 40 and the heat dissipation member 30, between the second transparent plate 57 and the heat dissipation member 30, and between the heat dissipation member 30 and the frame 60, but the air layer is not interposed. However, the adhesive P is not interposed between the protrusion portion 515 of the first substrate 51 of the electro-optical panel 40 and the heat dissipation member 30, or between the flexible wiring board 40i and the heat dissipation member 30, but the air layer is interposed.

Method of Manufacturing Electro-Optical Module 10

In the method of manufacturing the electro-optical module 10 described referring to FIG. 5A to FIG. 8, firstly, the entire surface of the first transparent plate 56 and the entire surface of the second transparent plate 57 are adhered to the both sides of the electro-optical panel 40 by an adhesive.

Next, the electro-optical panel 40 is provided inside of the frame 60 with the first transparent plate 56 side leading from the one side Z1 of the frame 60 in the Z-axis direction. As a result, the first transparent plate 56 is brought into contact with the plate-shaped light shielding portion 67, and the protrusion surface 55 of the first substrate 51 is brought into contact with the corner portions 610, 620, 630, and 640 of the frame 60, and thus, the position determination of the first transparent plate 56 and the electro-optical panel 40 in the Z direction is performed. In addition, the side surfaces 561, 562, 563, and 564 of the first transparent plate 56 are in contact with the corner portions 610, 620, 630, and 640, and thus, the position determinations of the first transparent plate 56 and the electro-optical panel 40 in the X direction and the Y direction are performed. At this time, the adhesive P is applied to the inside of the frame 60, around the electro-optical panel 40, and around the second transparent plate 57 in advance.

Next, the heat dissipation member 30 is inserted between the electro-optical panel 40 and second transparent plate 57 and the frame 60, and thereafter, the light shielding plate 80 and the frame 60 are coupled. In this state, the adhesive P is cured.

The light shielding plate 80 and the heat dissipation member 30 are bonded in advance, and after the first transparent plate 56, the electro-optical panel 40, and the second transparent plate 57 are accommodated inside of the frame 60, then, the light shielding plate 80 to which the heat dissipation member 30 is bonded is coupled to the frame 60. Thereafter, the adhesive P may be cured.

In addition, when the second transparent plate 57 is adhered to the second substrate 52 of the electro-optical panel 40, the heat dissipation member 30 may be used for the position determination of the second transparent plate 57. Specifically, after the first transparent plate 56 is adhered to the first substrate 51 of the electro-optical panel 40, the electro-optical panel 40 to which the first transparent plate 56 is adhered is accommodated inside of the heat dissipation member 30. At this time, the adhesive P is applied inside of the heat dissipation member 30 in advance. Next, the second transparent plate 57 is inserted through the opening portion 38 of the heat dissipation member 30, and in a state of position determination of the second transparent plate 57 by the heat dissipation member 30, the second transparent plate 57 and the second substrate 52 of the electro-optical panel 40 are overlapped via the adhesive. Next, the heat dissipation member 30 in which the first transparent plate 56, the electro-optical panel 40, and the second transparent plate 57 are held is accommodated inside of the frame 60. At this time, the adhesive P is applied inside of the frame 60 in advance. Thereafter, the light shielding plate 80 is coupled to the frame 60, and in this state, the adhesive P is cured.

In addition, after the electro-optical panel 40 to which the first transparent plate 56 is adhered and the heat dissipation member 30 are accommodated inside of the frame 60, the heat dissipation member 30 may be used for the position determination of the second transparent plate 57. Specifically, after the electro-optical panel 40 to which the first transparent plate 56 is adhered and the heat dissipation member 30 are accommodated inside of the frame 60, the second transparent plate 57 is inserted through the opening portion 38 of the heat dissipation member 30, and in a state of position determination of the second transparent plate 57 by the heat dissipation member 30, the second transparent plate 57 and the second substrate 52 of the electro-optical panel 40 are overlapped via the adhesive. Thereafter, the light shielding plate 80 is coupled to the frame 60, and in this state, the adhesive P is cured.

Main Effects of the Present Embodiment

As described above, in the electro-optical module 10 in the present embodiment, the frame 60 surrounds the first substrate 51 on the side surfaces 521, 522, and 523 side of the second substrate 52. However, the frame 60 does not exist on the side surface 514 of the side where the protrusion portion 515 of the first substrate 51 is positioned, or at the position facing the side surface 524 of the second substrate 52. For this reason, the frame 60 does not interfere with the wiring material such as the flexible wiring board 40i which is connected to the protrusion portion 515 to be pulled out to the outside.

In addition, in the present embodiment, the heat dissipation member 30 is disposed between the frame 60 and the electro-optical panel 40, and the heat dissipation member 30 includes the surface of the second substrate 52 side of the protrusion portion 515 of the first substrate 51, the side surface 524 of the second substrate 52, the protrusion surface protruding from the second transparent plate 57 of the second substrate 52, and the frame portion 34 (the first frame portion) facing the side surface 574 of the second transparent plate 57. In addition, the heat dissipation member 30 includes the frame portion 31 (the second frame portion) that extends from one end side of the frame portion 34 toward between the side surface 521 of the second substrate 52 and the frame 60, and the frame portion 32 (the third frame portion) that extends from the other end side of the frame portion 34 toward between the side surface 522 of the second substrate 52 and the frame 60. For this reason, the frame 60 does not exist on the position facing the side surface 514 of the side where the protrusion portion 515 of the first substrate 51 is positioned or the side surface 524 of the second substrate 52. However, at the side where the protrusion portion 515 is positioned, the heat generated in the electro-optical panel 40 after being released to the frame portions 31 and 32 via the frame portion 34 of the heat dissipation member 30, then, can further be released to the frame 60. Therefore, it is possible to suppress the variation of the temperature or the increase of the temperature of the entire electro-optical panel 40 without increasing the size of the electro-optical module 10. Accordingly, it is possible to suppress the deterioration of the electro-optical material layer 450 caused by the increase of the temperature of the electro-optical panel 40.

Particularly, in a case where the molded article in which the metal layer is provided on the surface of the member made of resin is used as the frame 60, or in a case where the thermal conductivity of the heat dissipation member 30 is higher than that of the frame 60 depending on the metal layer, it is possible to release the heat of the electro-optical panel 40 to the heat dissipation member 30 with a high efficiency. Therefore, by using the heat dissipation member 30, it is possible to suppress the variation of the temperature or the increase of the temperature of the entire electro-optical panel 40. In addition, in a case where the heat capacity of the heat dissipation member 30 is larger than that of the frame 60 such as a case in which the frame 60 is thin, or in a case where there is a thin part in the frame 60, it is possible to release the heat of the electro-optical panel 40 to the heat dissipation member 30 with a high efficiency. Accordingly, by using the heat dissipation member 30, it is possible to suppress the variation of the temperature or the increase of the temperature of the entire electro-optical panel 40.

In addition, the frame portions 61, 62, and 63 (the second, third, and fourth frame portions) of the heat dissipation member 30 respectively face the end portion of the side where the side surfaces 511, 512, and 513 of the first substrate 51 are positioned, the end portion of the side where the side surfaces 521, 522, and 523 of the second substrate 52 are positioned, and the frame 60. For this reason, it is possible to release the heat of the electro-optical panel 40 to the frame 60 from the end portion of the side where the side surfaces 511, 512, and 513 of the first substrate 51 are positioned or the end portion of the side where the side surfaces 521, 522, and 523 of the second substrate 52 are positioned via the heat dissipation member 30.

In addition, the adhesive P is interposed between the electro-optical panel 40 and the heat dissipation member 30, between the second transparent plate 57 and the heat dissipation member 30, and between the heat dissipation member 30 and the frame 60, but the air layer is not interposed. Therefore, it is possible to release the heat of the electro-optical panel 40 to the frame 60 via the heat dissipation member 30 with a high efficiency with a high efficiency.

In addition, in a plan view, the width of the frame portion 34 is larger than that of the frame portions 31 and 32. For this reason, it is possible to release the heat generated in the electro-optical panel 40 to the heat dissipation member 30 from the side where the protrusion portion 515 is positioned.

In addition, in the present embodiment, the first transparent plate 56 is provided such that a part of the second surface 51b of the first substrate 51 is exposed, and the corner portions 610, 620, 630, and 640 of the frame 60 face the protrusion surface 55 protruding from the first transparent plate 56 of the first substrate 51 and the side surfaces 561, 562, 563, and 564 of the first transparent plate 56. In addition, the adhesive P is interposed between the protrusion surface 55 protruding from the first transparent plate 56 of the first substrate 51 and the frame 60 and between the side surfaces 511, 512, and 513 of the first substrate 51 and the frame 60, but the air layer is not interposed. Therefore, it is possible to release the heat generated in the electro-optical panel 40 to the frame 60 from the first substrate 51 with a high efficiency.

In addition, the size of the first transparent plate 56 is smaller than that of the first substrate 51, and the protrusion surface 55 of the first substrate 51 and the corner portions 610, 620, 630, and 640 of the frame 60 are provided so as to surround the entire circumference of the first transparent plate 56. For this reason, since the overlapping area of the protrusion surface 55 of the first substrate 51 and the frame 60 is large, it is possible to release the heat generated in the electro-optical panel 40 to the frame 60 from the first substrate 51 with a high efficiency. In the first substrate 51, in the protrusion surface 55a side where the protrusion portion 515 is positioned, the overlapping width with respect to the frame 60 is larger than that of the second protrusion surface 55b which is positioned at the side opposite to the protrusion surface 55a across the first transparent plate 56, and thus, the heat dissipation is high. Therefore, according to the present embodiment, the heat on the side where the protrusion portion 515 is positioned can also be dissipated with a high efficiency, and thus, it is possible to suppress the increase of the temperature.

Furthermore, for the first substrate 51 and the second substrate 52, the frame 60 overlaps the protrusion portion of the first substrate 51 which is the element substrate. For this reason, when the light passes through the electro-optical panel 40, the heat generation in the first substrate 51 is larger than that in the second substrate 52. However, in the present embodiment, since the frame 60 overlaps the protrusion surface 55 of the element substrate (the first substrate 51) the heat generation is high. Therefore, it is possible to release the heat generated in the electro-optical panel 40 with a high efficiency.

In addition, in the present embodiment, since the plate-shaped light shielding portion 67 is provided on the frame 60, it is not necessary to dispose a light shielding plate on the first transparent plate 56 side. In addition, the thickness of the plate-shaped light shielding portion 67 is quite small compared to the thickness (dimension in the Z-axis direction) of the frame portions 61, 62, 63, and 64. For this reason, as illustrated by the arrow A, when the cooling air flow is formed along the surface of the other side Z2 of the electro-optical module 10 in the Z-axis direction by the air intake fan 15B illustrated in FIG. 1B, the cooling air smoothly enters the opening portion 670 of the plate-shaped light shielding portion 67 and flows to the one side Y1 from the other side Y2 in the Y-axis direction. For this reason, it is possible to release the heat generated in the electro-optical panel 40 to the cooling air via the first transparent plate 56.

Modification Example 1 of Embodiment 1

FIG. 9A and FIG. 9B are cross-sectional views of the electro-optical module 10 in modification example 1 of Embodiment 1 of the invention. FIG. 9A is a YZ cross-sectional view of the electro-optical module and FIG. 9B is an XZ cross-sectional view of the same. Since the basic configuration in the modification example is similar to that in Embodiment 1, the common portions will be referred to by common signs, and the description thereof will be omitted.

As illustrated in FIG. 9A and FIG. 9B, in the electro-optical module 10 in the present example also, similarly to Embodiment 1, the heat dissipation member 30 is disposed between the electro-optical panel 40 and the frame 60. In addition, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56.

In the present example, differently from Embodiment 1, a light shielding layer 569 for forming the boarder is formed on the surface of the electro-optical panel 40 side of the first transparent plate 56, and the plate-shaped light shielding portion 67 is not formed on the frame 60. For this reason, on the other side Z2 in the Z-axis direction where the first transparent plate 56 is positioned, an end portion 60s of the frame 60 and the surface side opposite to the first substrate 51 of the first transparent plate 56 are positioned in the same plane. Here, the light shielding layer 569 is made by laminating the chromium oxide layer (metal compound layer/light absorbing layer) and the chromium layer (metal layer/light reflection layer) from the first transparent plate 56 side. Since other configurations are similar to that in Embodiment 1, the present example provides the same effect as that in Embodiment 1.

In addition, in the present example, on the other side Z2 of the first transparent plate 56 in the Z-axis direction, there is no step difference caused by the plate-shaped light shielding portion 67. Therefore, as illustrated by the arrow A, when the cooling air flow is formed along the surface of the other side Z2 of the electro-optical module 10 in the Z-axis direction by the air intake fan 15B illustrated in FIG. 1B, the cooling air smoothly flows from the other side Y2 in the Y-axis direction to the one side Y1 along the surface of the other side Z2 of the first transparent plate 56 in the Z-axis direction. Therefore, it is possible to release the heat generated in the electro-optical panel 40 to the cooling air via the first transparent plate 56 and the frame 60.

Modification Example 2 of Embodiment 1

Figure 10A:
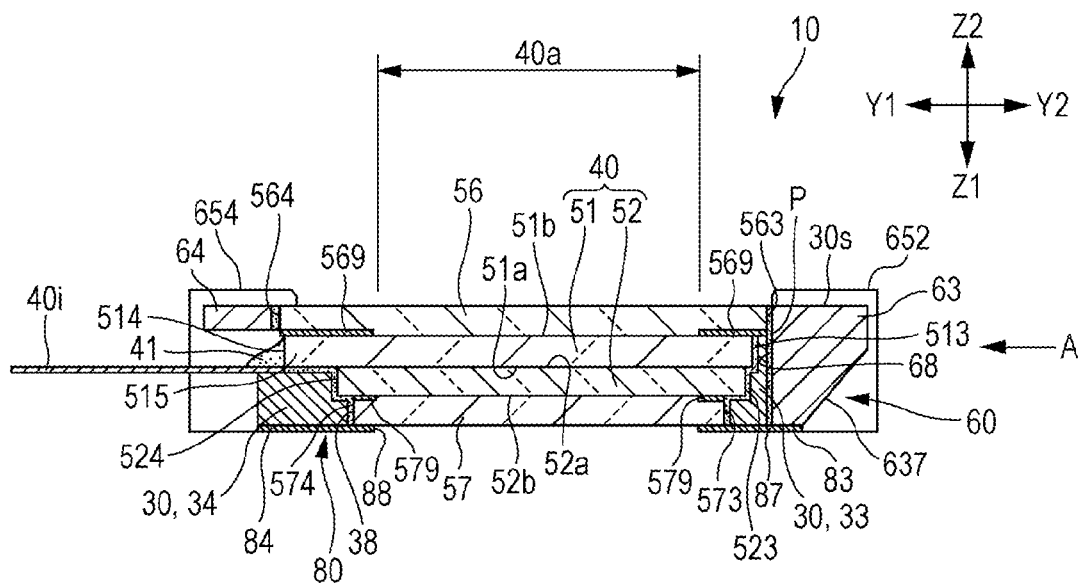
FIG. 10A and FIG. 10B are cross-sectional views of an electro-optical module in modification example 2 of Embodiment 1 of the invention.
Figure 10B:
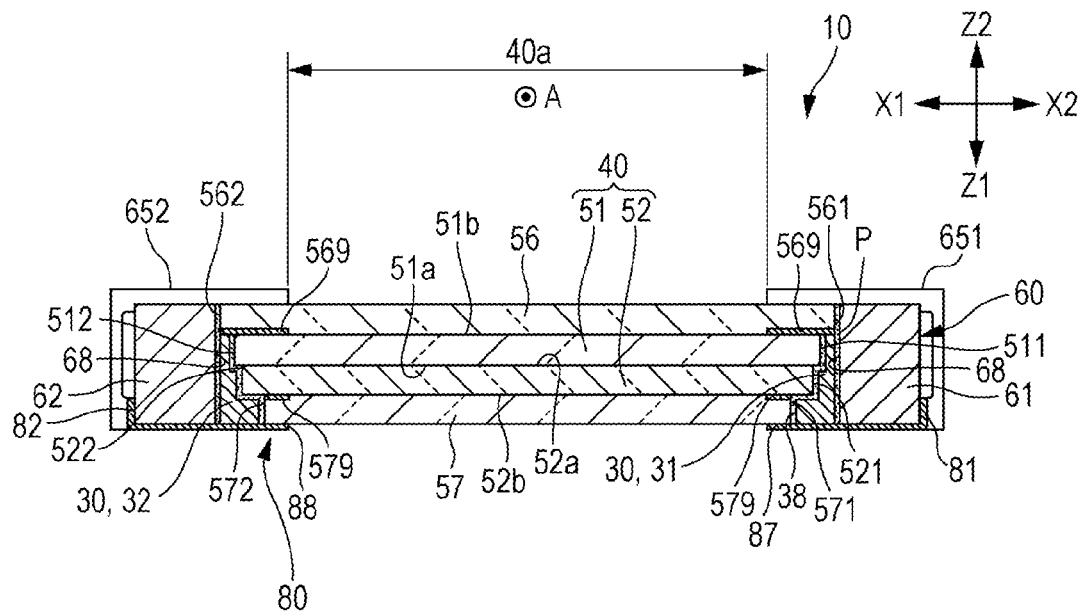

FIG. 10A and FIG. 10B are cross-sectional views of an electro-optical module 10 in the modification example 2 of Embodiment 1 of the invention. FIG. 10A is a YZ cross-sectional view of the electro-optical module and FIG. 10B is an XZ cross-sectional view of the same. Since the basic configuration in the modification example is similar to that in Embodiment 1, the common portions will be referred to by the same signs, and the description thereof will be omitted.

As illustrated in FIG. 10A and FIG. 10B, in the electro-optical module 10 in the present example also, similarly to Embodiment 1, the heat dissipation member 30 is disposed between the electro-optical panel 40 and the frame 60. In the present example, the size of the first transparent plate 56 is larger than that of the first substrate 51, and the surface of the first substrate 51 side of the first transparent plate 56 includes a protrusion surface protruding from the first substrate 51 over the entire circumference of the first substrate 51. In correspondence to such a configuration, the inner side surface of the frame 60 linearly extends throughout the Z-axis direction.

In the electro-optical module 10 having such a configuration, in the present example, similarly to the modification example 1 of Embodiment 1, a light shielding layer 569 for forming the boarder is formed on the surface of the electro-optical panel 40 side of the first transparent plate 56, and the plate-shaped light shielding portion 67 is not formed on the frame 60. For this reason, on the other side Z2 in the Z-axis direction where the first transparent plate 56 is positioned, an end portion 60s of the frame 60 and the surface side opposite to the first substrate 51 of the first transparent plate 56 are positioned in the same plane. In addition, the light shielding layer 569 is formed up to the outer peripheral edge of the first transparent plate 56. For this reason, the light shielding layer 569 is exposed form the first substrate 51 over the entire circumference of the first substrate 51 and faces the end portion of the other side Z2 of the heat dissipation member 30 in the Z-axis direction. In addition, between the first transparent plate 56 and the frame 60 and between the first transparent plate 56 and the heat dissipation member 30, the adhesive P is interposed, but the air layer is not interposed. Since other configurations are similar to that in Embodiment 1, the present example provides the same effect as that in Embodiment 1.

In addition, in the present example, on the other side Z2 of the first transparent plate 56 in the Z-axis direction, there is no step difference caused by the plate-shaped light shielding portion 67. Therefore, similarly to Embodiment 1, the cooling air smoothly flows from the other side Y2 in the Y-axis direction to the one side Y1 along the surface of the other side Z2 of the first transparent plate 56 in the Z-axis direction. Therefore, it is possible to release the heat generated in the electro-optical panel 40 to the cooling air via the first transparent plate 56 and the frame 60. In addition, the light shielding layer 569 has higher thermal conductivity than the first substrate 51 and the second substrate 52, and faces the end portion of the other side Z2 of the heat dissipation member 30 in the Z-axis direction. For this reason, it is possible to release the heat of the electro-optical panel 40 or the heat generated in the light shielding layer 569 by absorbing the light to the frame 60 via the heat dissipation member 30 with a high efficiency.

Embodiment 2

Figure 11A:
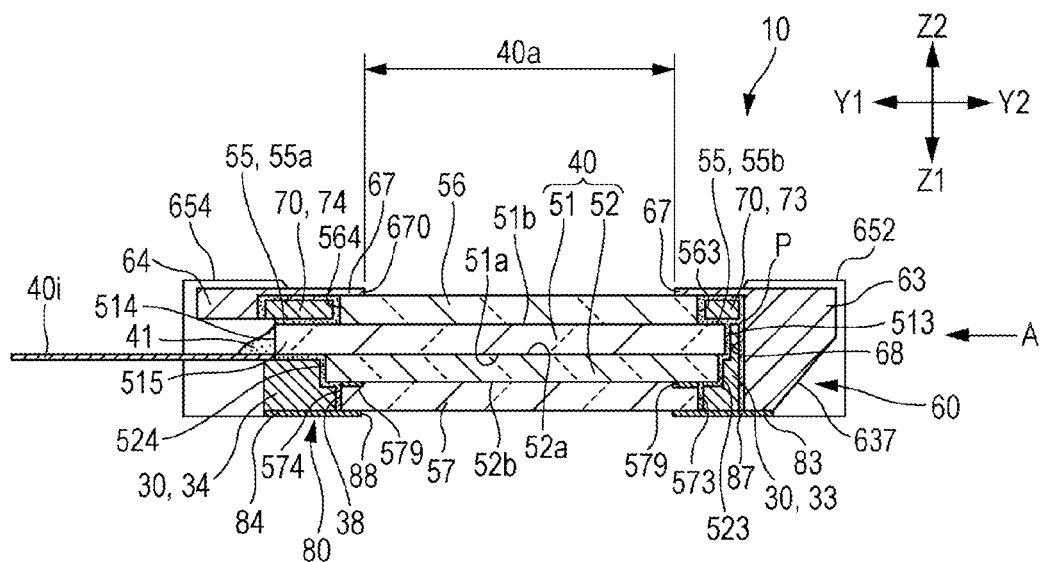
FIG. 11A and FIG. 11B are cross-sectional views of an electro-optical module in Embodiment 2 of the invention.
Figure 11B:
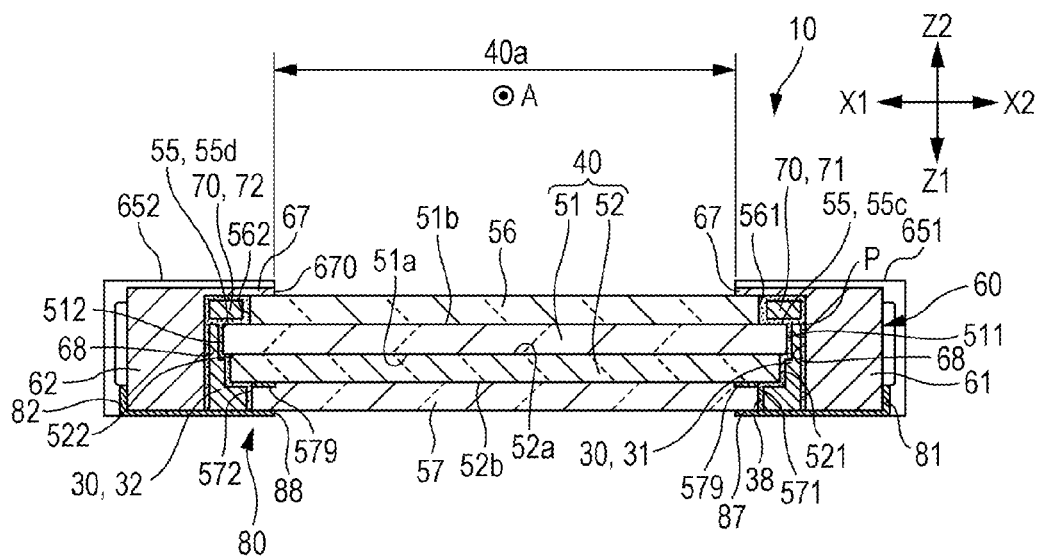

FIG. 11A and FIG. 11B are cross-sectional views of an electro-optical module 10 in Embodiment 2. FIG. 11A is a YZ cross-sectional view of the electro-optical module and FIG. 11B is an XZ cross-sectional view of the same. Since the basic configuration in the modification example is similar to that in Embodiment 1, the common portions will be referred to by the same signs, and the description thereof will be omitted.

As illustrated in FIG. 11A and FIG. 11B, in the electro-optical module 10 in the present embodiment also, similarly to Embodiment 1, the heat dissipation member 30 is disposed between the electro-optical panel 40 and the frame 60. In addition, the size of the first transparent plate 56 is smaller than that of the first substrate 51, and on the surface of the first transparent plate 56 side of the first substrate 51, the protrusion surface 55 protruding from the first transparent plate 56 is formed over the entire circumference of the first transparent plate 56. However, the inner side surface of the frame 60 linearly extends throughout the Z-axis direction, and thus, there is a wide gap between the side surfaces 561, 562, 563, and 564 of the first transparent plate 56 and the frame 60.

In the present embodiment, in the gap formed between the side surfaces 561, 562, 563, and 564 of the first transparent plate 56 and the frame 60, a rectangular frame-shaped plate 70 is disposed. The plate 70 is a member made of metal such as aluminum, copper or iron, and the thermal conductivity thereof is higher than that of first substrate 51 and second substrate 52.

In the plate 70, a frame portion 71 positioned between the side surface 561 of the first transparent plate 56 and the frame 60 faces the side surface 561 of the first transparent plate 56, the frame portion 61 of the frame 60, the protrusion surface 55c of the first substrate 51 and the end portion of the other side Z2 of the heat dissipation member 30 in the Z-axis direction. The frame portion 72 of the plate 70 positioned between the side surface 562 of the first transparent plate 56 and the frame 60 faces the side surface 562 of the first transparent plate 56, the frame portion 62 of the frame 60, the protrusion surface 55d of the first substrate 51, and the end portion of the other side Z2 of the heat dissipation member 30 in the Z-axis direction. The frame portion 73 of the plate 70 positioned between the side surface 563 of the first transparent plate 56 and the frame 60 faces the side surface 563 of the first transparent plate 56, the frame portion 63 of the frame 60, the protrusion surface 55b of the first substrate 51, and the end portion of the other side Z2 of the heat dissipation member 30 in the Z-axis direction. The frame portion 74 of the plate 70 positioned between the side surface 564 of the first transparent plate 56 and the frame 60 faces the side surface 564 of the first transparent plate 56, the frame portion 64 of the frame 60, the protrusion surface 55a of the first substrate 51, and the end portion of the other side Z2 of the heat dissipation member 30 in the Z-axis direction. In the present embodiment, in the plate 70 in plan view, the width of the frame portion 74 is larger than that of the other frame portions 71, 72, 73, and 74. Since other configurations are similar to that in Embodiment 1, the present example provides the same effect as that in Embodiment 1.

In addition, in the present embodiment, the plate 70 disposed between the first transparent plate 56 and the frame 60 faces the side surfaces 561, 562, 563, and 564 of the first transparent plate 56, the frame portions 61, 62, 63, and 64 of the frame 60, the protrusion surface 55 of the first substrate 51, and the end portion of the other side Z2 of the heat dissipation member 30 in the Z-axis direction. In addition, the adhesive P is interposed between the plate 70 and the first transparent plate 56, between the plate 70 and the frame 60, and between the plate 70 and the heat dissipation member 30, but the air layer is not interposed. Therefore, it is possible to release the heat generated in the electro-optical panel 40 to the frame 60 via the plate 70 and the heat dissipation member 30. Particularly, in a case where a molded article in which a metal layer is provided on the surface of the resin made member is used as the frame 60, or in a case where, depending on the type of the metal material, the thermal conductivity of the plate 70 is higher than that of the frame 60, it is possible to release the heat of the electro-optical panel 40 to the plate 70 with a high efficiency. Therefore, by using the plate 70, it is possible to suppress the variation of the temperature or the increase of the temperature of the entire electro-optical panel 40. In addition, in a case where the heat capacity of the plate 70 is larger than that of the frame 60 such as a case in which the frame 60 is thin, or in a case where there is a thin part in the frame 60, it is possible to release the heat of the electro-optical panel 40 to the plate 70 with a high efficiency. Accordingly, by using the plate 70, it is possible to suppress the variation of the temperature or the increase of the temperature of the entire electro-optical panel 40.

In the process of manufacturing the electro-optical module 10 in the present embodiment, after bonding and fixing the plate 70 to the frame 60, assembling is performed in the same method as in Embodiment 1.

Modification Example 1 of Embodiment 2

In the electro-optical module 10 described in Embodiment 2 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 2 of Embodiment 2

In the electro-optical module 10 described in Embodiment 2 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 3

Figure 12A:
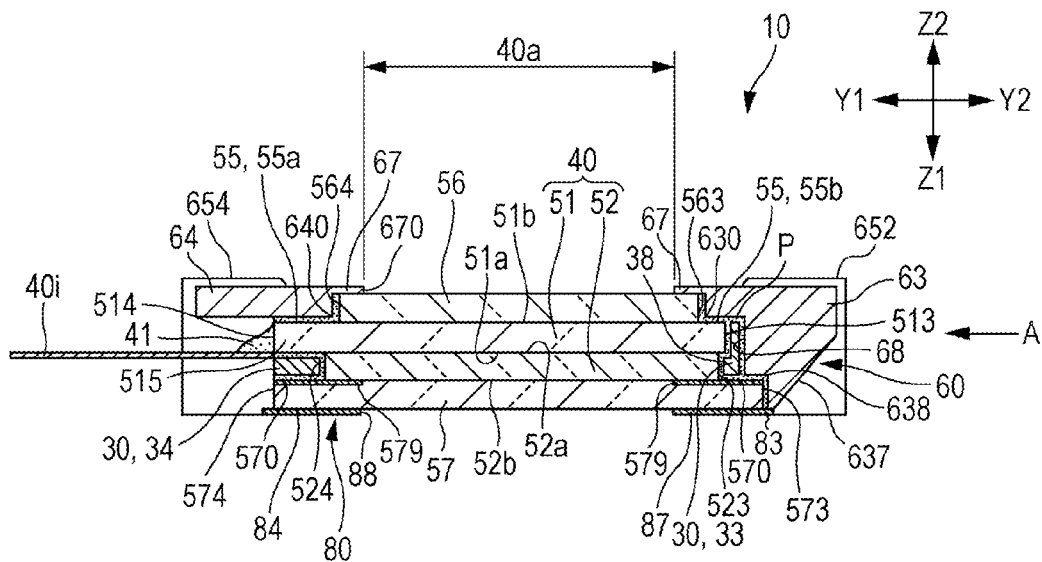
FIG. 12A and FIG. 12B are cross-sectional views of an electro-optical module in Embodiment 3 of the invention.
Figure 12B:
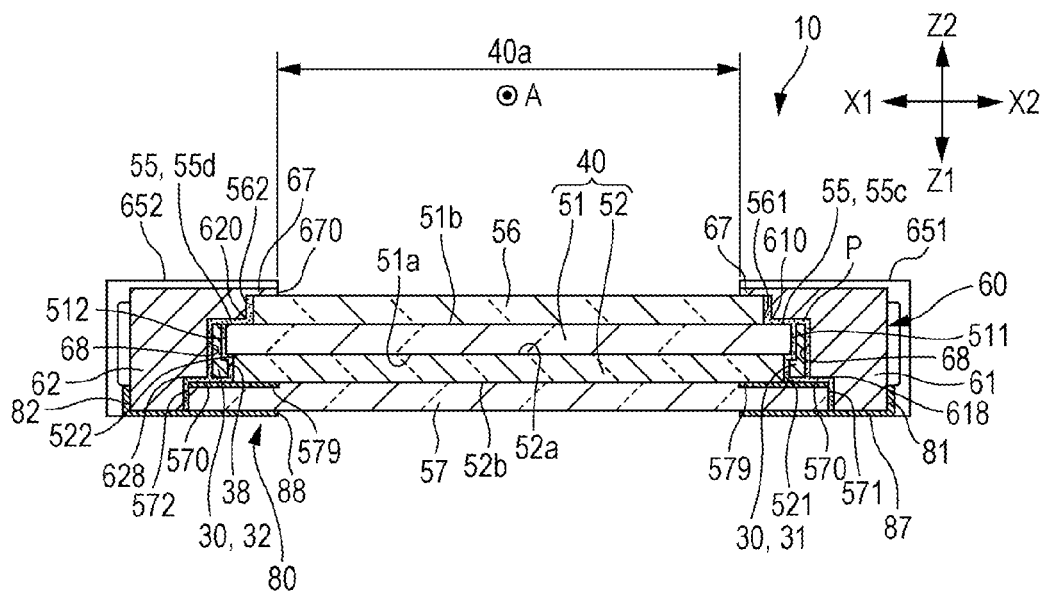

FIG. 12A and FIG. 12B are cross-sectional views of an electro-optical module 10 in Embodiment 3 of the invention. FIG. 12A is a YZ cross-sectional view of the electro-optical module and FIG. 12B is an XZ cross-sectional view of the same. Since the basic configuration in the present embodiment is similar to that in Embodiment 1, the common portions will be referred to by the same signs, and the description thereof will be omitted.

As illustrated in FIG. 12A and FIG. 12B, in the electro-optical module 10 in the present embodiment also, similarly to Embodiment 1, the heat dissipation member 30 is disposed between the electro-optical panel 40 and the frame 60. In addition, each of corner portions 610, 620, 630, and 640 of the frame 60 faces the protrusion surface 55 protruding from the first transparent plate 56 of the first substrate 51 and the side surfaces 561, 562, 563, and 564 of the first transparent plate 56.

In the present embodiment, the second transparent plate 57 has a larger size than the second substrate 52 and has a rectangular shape, and on the surface of the second substrate 52 side of the second transparent plate 57, a protrusion surface 570 protruding from the second substrate 52 is formed so as to surround the entire circumference of the second substrate 52. For this reason, the heat dissipation member 30 is positioned on the other side Z2 in the Z-axis direction with respect to the second transparent plate 57, and in the surface of the second substrate 52 side of the second transparent plate 57, the heat dissipation member 30 overlaps the protrusion surface 570 protruding from the second substrate 52. Therefore, the inner side surface of the frame portions 31, 32, and 33 of the heat dissipation member 30 faces the side surfaces 511, 512, and 513 of the first substrate 51, a protrusion surface of the first surface 51a of the first substrate 51 protruding from the second substrate 52, and the side surfaces 521, 522, and 523 of the second substrate 52. The frame portion 34 of the heat dissipation member 30 is formed on the planar plate of which the inner surface side faces the side surface 524 of the second substrate 52.

In addition, in the surface of the second substrate 52 side of the second transparent plate 57, the light shielding layer 579 is formed up to the edge of the second transparent plate 57, and the light shielding layer 579 is formed on the entire protrusion surface 570 protruding from the second substrate 52. For this reason, the end portion of the one side Z1 of the heat dissipation member 30 in the Z-axis direction overlaps the light shielding layer 579, and the adhesive P is interposed between the light shielding layer 579 and the heat dissipation member 30. In the light shielding layer 579 in the present embodiment, the width of a part formed on the one side Y1 in the Y-axis direction is larger than that formed on other positions. Therefore, the overlapping width of the frame portion 34 of the heat dissipation member 30 and the light shielding layer 579 is larger than the overlapping width of the frame portions 31, 32, and 33 of the heat dissipation member 30 and the light shielding layer 579.

In correspondence to such a configuration, in the frame portions 61, 62, and 63 of the frame 60, the side surfaces 571, 572, and 573 of the second transparent plate 57 and the internal corner-shaped corner portions 618, 628, and 638 bent along the protrusion surface 570 protruding from the second substrate 52 of the second transparent plate 57 are formed. For this reason, the frame 60 faces the side surfaces 571, 572, and 573 of the second transparent plate 57 and the protrusion surface 570 protruding from the second substrate 52 of the second transparent plate 57 by the corner portions 618, 628, and 638. In addition, the adhesive P is interposed between the frame 60 and the side surfaces 571, 572, 573, and 574 of the second transparent plate 57, and between the frame 60 and the protrusion surface 570 protruding from the second substrate 52 of the second transparent plate 57, but the air layer is not interposed. In addition, on the inner surface side of the frame portions 31, 32, and 33, a step portion bent along the step caused by the first transparent plate 56 and the heat dissipation member 30 is formed. Since other configurations are similar to that in Embodiment 1, the present example provides the same effect as that in Embodiment 1.

In addition, in the present embodiment, the end portion of the one side Z1 of the heat dissipation member 30 in the Z-axis direction overlaps the light shielding layer 579, and the adhesive P is interposed between the light shielding layer 579 and the heat dissipation member 30. For this reason, it is possible to release the heat of the electro-optical panel 40 to the heat dissipation member 30 via the light shielding layer 579. In addition, it is possible to release the heat of the light shielding layer 579 generated by the light absorption to the heat dissipation member 30 via the light shielding layer 579.

Modification Example 1 of Embodiment 3

Figure 13A:
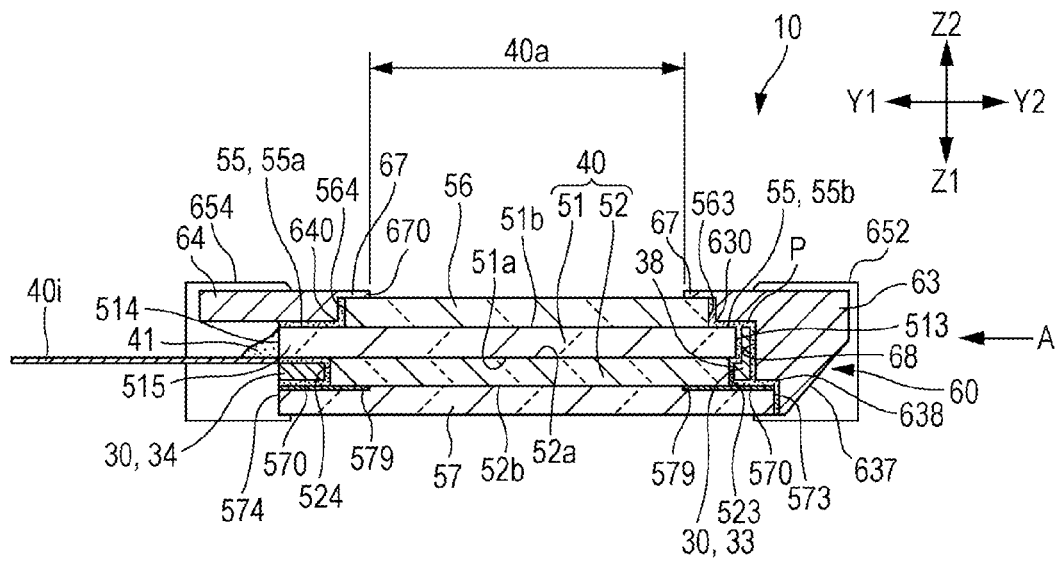
FIG. 13A and FIG. 13B are cross-sectional views of an electro-optical module in a modified example 1 of Embodiment 3 of the invention.
Figure 13B:
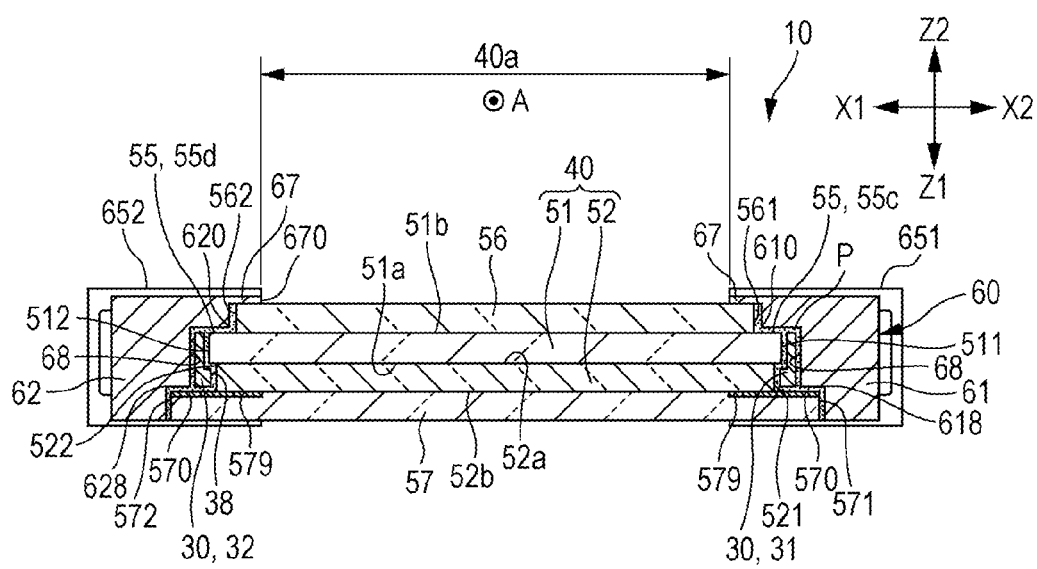

FIG. 13A and FIG. 13B are cross-sectional views of an electro-optical module 10 in a modified example 1 in Embodiment 3. FIG. 13A is a YZ cross-sectional view of the electro-optical module and FIG. 13B is an XZ cross-sectional view of the same. Since the basic configuration in the modification example is similar to that in Embodiment 1, the common portions will be referred to by the same signs, and the description thereof will be omitted.

As illustrated in FIG. 13A and FIG. 13B, in the electro-optical module 10 in the present example also, similarly to Embodiment 1, the heat dissipation member 30 is disposed between the electro-optical panel 40 and the frame 60. In addition, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56. In addition, the second transparent plate 57 has a size larger than the second substrate 52 and has a rectangular shape, and the light shielding layer 579 is formed up to the edge of the second transparent plate 57. Therefore, in the present example, the light shielding plate 80 is not used, and forming the boarder for the incident side is configured only by the light shielding layer 579. For this reason, on the one side Z1 in the Z-axis direction where the second transparent plate 57 is positioned, the end portion 60*t* of the frame 60 and the second substrate 52 of the second transparent plate 57 are positioned in the same plane as the surface of the opposite side. Since other configurations are similar to that in the embodiments 1 and 3, the present example provides the same effect as that in the embodiments 1 and 3.

In addition, in the present example, on the one side Z1 of the second transparent plate 57 in the Z-axis direction, there is no step difference caused by the light shielding plate 80. Therefore, as illustrated by the arrow A, when the cooling air flow is formed along the surface of the other side Z2 of the electro-optical module 10 in the Z-axis direction by the air intake fan 15B illustrated in FIG. 1B, the cooling air smoothly flows from the other side Y2 in the Y-axis direction to the one side Y1 along the surface of the one side Z1 of the second transparent plate 57 in the Z-axis direction. Therefore, it is possible to release the heat generated in the electro-optical panel 40 to the cooling air via the second transparent plate 57 and the frame 60. The configuration described in the present example may be adapted to the embodiments 1 and 2.

Modification Example 2 of Embodiment 3

In the electro-optical module 10 described in Embodiment 3 and the modification example 1 of Embodiment 3 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 3

In the electro-optical module 10 described in Embodiment 3 and the modification example 1 of Embodiment 3 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 4

Figure 14A:
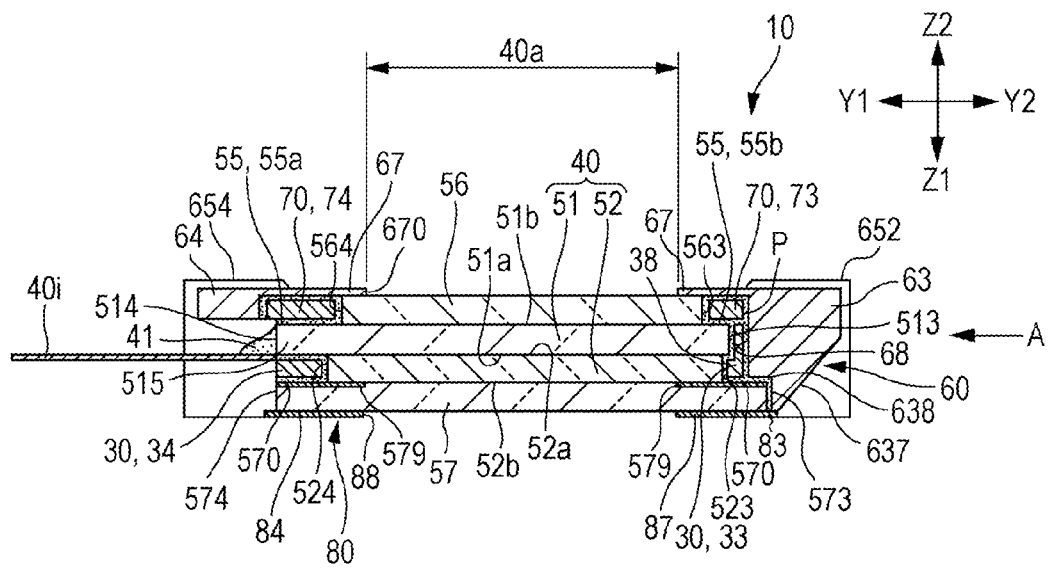
FIG. 14A and FIG. 14B are cross-sectional views of an electro-optical module in Embodiment 4 of the invention.
Figure 14B:
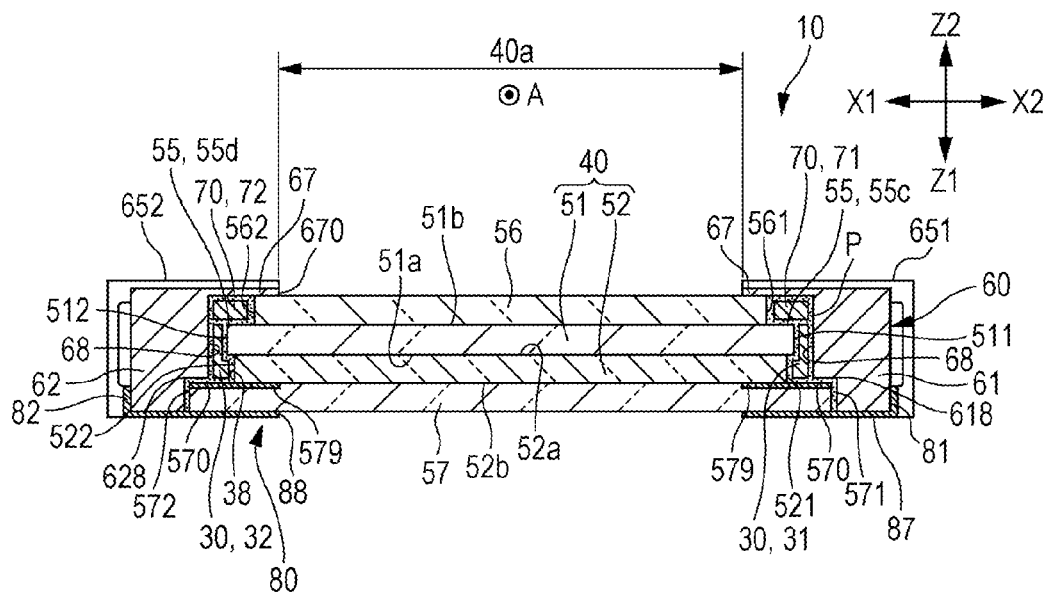

FIG. 14A and FIG. 14B are cross-sectional views of an electro-optical module 10 in Embodiment 4. FIG. 14A is a YZ cross-sectional view of the electro-optical module and FIG. 14B is an XZ cross-sectional view of the same. Since the basic configuration in the modification example is similar to that in Embodiment 1, the common portions will be referred to by the same signs, and the description thereof will be omitted.

As illustrated in FIG. 14A and FIG. 14B, in the electro-optical module 10 in the present embodiment also, similarly to Embodiment 1, the heat dissipation member 30 is disposed between the electro-optical panel 40 and the frame 60. In addition, similarly to Embodiment 3, the second transparent plate 57 has a larger size than the second substrate 52 and has a rectangular shape, the light shielding layer 579 is formed up to the edge of the second transparent plate 57, and the end portion of the one side Z1 of the heat dissipation member 30 in the Z direction faces the light shielding layer 579. In addition, similarly to Embodiment 1, the size of the first transparent plate 56 is smaller than that of the first substrate 51, and on the surface of the first transparent plate 56 side of the first substrate 51, the protrusion surface 55 protruding from the first transparent plate 56 is formed over the entire circumference of the first transparent plate 56.

In the present embodiment, similarly to Embodiment 2, the inner side surface of the frame 60 linearly extends toward the other side Z2 in the Z-axis direction from the position facing the side surfaces 521, 522, and 523 of the second substrate 52, and thus, there is a wide gap between the side surfaces 561, 562, 563, and 564 of the first transparent plate 56 and the frame 60. Therefore, in the gap formed between the side surfaces 561, 562, 563, and 564 of the first transparent plate 56 and the frame 60, a rectangular frame-shaped plate 70 is disposed, and thus, the heat of the electro-optical panel 40 can be released to the frame 60 via the plate 70 and the heat dissipation member 30.

Modification Example 1 of Embodiment 4

In the electro-optical module 10 described in Embodiment 4 above, a configuration may be adopted, in which the light shielding plate 80 is not used, and the cooling air smoothly flows from the other side Y2 in the Y-axis direction to the one side Y1 along the surface of the one side Z1 of the second transparent plate 57 in the Z-axis direction as described in the modification example 1 of Embodiment 3.

Modification Example 2 of Embodiment 4

In the electro-optical module 10 described in Embodiment 4 and the modification example 1 of Embodiment 4 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 4

In the electro-optical module 10 described in Embodiment 4 and the modification example 1 of Embodiment 4 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 5

Figure 15A:
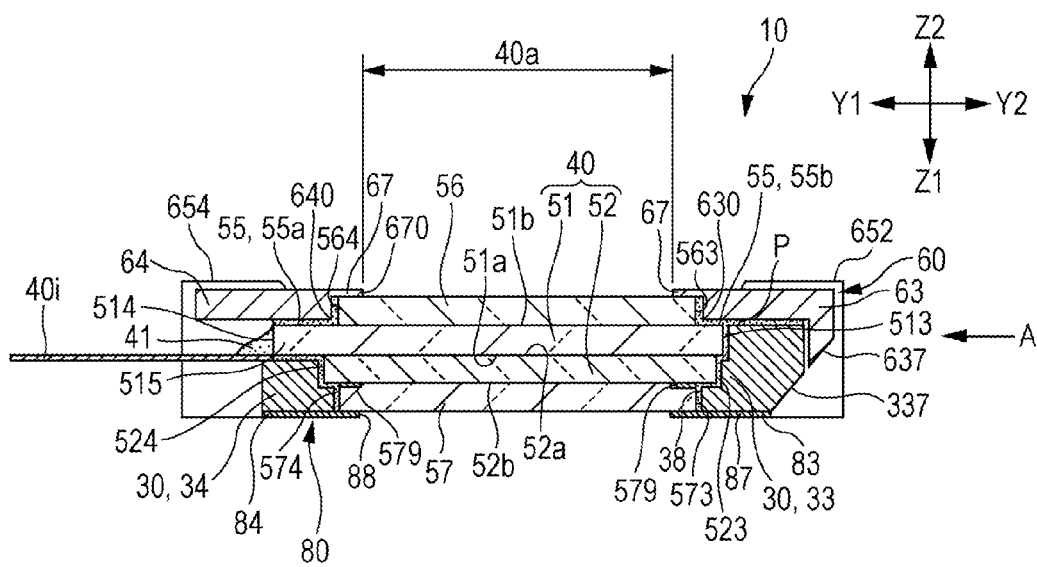
FIG. 15A and FIG. 15B are cross-sectional views of an electro-optical module in Embodiment 5 of the invention.
Figure 15B:
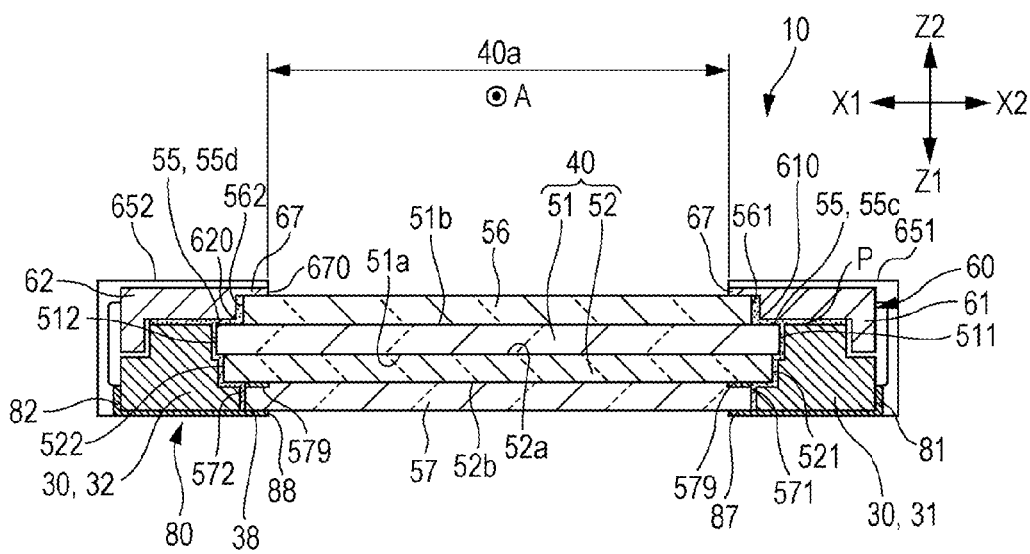

FIG. 15A and FIG. 15B are cross-sectional views of an electro-optical module 10 in Embodiment 5. FIG. 15A is a YZ cross-sectional view of the electro-optical module and FIG. 15B is an XZ cross-sectional view of the same. Since the basic configuration in the modification example is similar to that in Embodiment 1, the common portions will be referred to by the same signs, and the description thereof will be omitted.

As illustrated in FIG. 15A and FIG. 15B, in the electro-optical module 10 in the present embodiment also, similarly to Embodiment 1, the heat dissipation member 30 is disposed between the electro-optical panel 40 and the frame 60. In addition, each of corner portions 610, 620, 630, and 640 of the frame 60 faces the protrusion surface 55 protruding from the first transparent plate 56 of the first substrate 51 and the side surfaces 561, 562, 563, and 564 of the first transparent plate 56.

In the present embodiment, the frame 60 is disposed only on a part corresponding to the other side Z2 of the electro-optical module 10 in the Z-axis direction, and on a part corresponding to the one side Z1 of the electro-optical module 10 in the Z-axis direction, the heat dissipation member 30 is disposed.

Specifically, the heat dissipation member 30 includes the frame portion 31 that overlaps the frame portion 61 at the one side Z1 in the Z-axis direction inside of the frame portion 61 of the frame 60, the frame portion 32 that overlaps the frame portion 62 at the one side Z1 in the Z-axis direction inside of the frame portion 62 of the frame 60, and the frame portion 33 that overlaps the frame portion 63 at the one side Z1 in the Z-axis direction inside of the frame portion 63 of the frame 60, and the frame portions 31, 32, and 33 are in a state of protruding at the one side Z1 in the Z-axis direction with respect to the frame 60. For this reason, on the one side Z1 of the frame portion 33 in the Z-axis direction, on the end portion of the other side Y2 in the Y-axis direction, a tapered surface 337 that configures a tapered surface which is continuous with the tapered surface 637 of the frame portion 63 is formed. Therefore, when the cooling air is supplied to the electro-optical module 10 by the air intake fan 15B illustrated FIG. 1B, the cooling air is guided with a high efficiency to the one side Z1 of the electro-optical module 10 in the Z-axis direction.

In addition, the inner side surfaces of the frame portions 31, 32, and 33 have a multi-stage shape bent along the outer shape of the electro-optical panel 40 and the second transparent plate 57. For this reason, the inner side surface of the frame portions 31, 32, and 33 faces the side surfaces 511, 512, and 513 of the first substrate 51, the protrusion surface protruding from the second substrate 52 of the first surface 51a of the first substrate 51, the side surfaces 521, 522, and 523 of the second substrate 52, the protrusion surface protruding from the second transparent plate 57 of the second surface 52b of the second substrate 52, and the side surfaces 571, 572, and 573 of the second transparent plate 57. The adhesive P is interposed between the frame portions 31, 32, and 33, and the frame 60, and the electro-optical panel 40 and the second transparent plate 57. In addition, the inner side surface of the frame portion 34 has a step shape bent along the external shape of the second substrate 52 and the second transparent plate 57. For this reason, the inner side surface of the frame portion 34 faces the side surface 524 of the second substrate 52, the protrusion surface protruding from the second transparent plate 57 of the second surface 52b of the second substrate 52, and the side surface 574 of the second transparent plate 57. The adhesive P is interposed between the frame portion 34 and the second substrate 52 and the second transparent plate 57. In addition, the end surface of the other side Z2 of the frame portion 34 in the Z-axis direction faces the first surface 51a (the protrusion portion 515) of the first substrate 51. Since other configurations are similar to that in Embodiment 1, the present embodiment provides the effect substantially same as that in Embodiment 1.

In addition, in the present embodiment, the thin heat dissipation member 30 is disposed around the first substrate 51, second substrate 52, and second transparent plate 57, therefore, it is possible to release the heat of the electro-optical panel 40 to the frame 60 via the heat dissipation member 30 with a high efficiency. Particularly, in a case where the molded article in which the metal layer is provided on the surface of the member made of resin is used as the frame 60, or in a case where the thermal conductivity of the heat dissipation member 30 is higher than that of the frame 60 depending on the metal layer, it is possible to release the heat of the electro-optical panel 40 to the heat dissipation member 30 with a high efficiency. Therefore, by using the heat dissipation member 30, it is possible to suppress the variation of the temperature or the increase of the temperature of the entire electro-optical panel 40.

In the process of manufacturing the electro-optical module 10 in such a configuration, the heat dissipation member 30 can be used as the member for position determination of the second transparent plate 57. Specifically, after the first transparent plate 56 is adhered to the first substrate 51 of the electro-optical panel 40, the electro-optical panel 40 to which the first transparent plate 56 is adhered is accommodated inside of the heat dissipation member 30. At this time, the adhesive P is applied inside of the heat dissipation member 30 in advance. Next, the second transparent plate 57 is inserted through the opening portion 38 of the heat dissipation member 30, and in a state of position determination of the second transparent plate 57 by the heat dissipation member 30, the second transparent plate 57 and the second substrate 52 of the electro-optical panel 40 are overlapped via the adhesive. Next, the heat dissipation member 30 in which the first transparent plate 56, the electro-optical panel 40, and the second transparent plate 57 are held is accommodated inside of the frame 60. At this time, the adhesive P is applied inside of the frame 60 in advance. Thereafter, the light shielding plate 80 is coupled to the frame 60, and in this state, the adhesive P is cured.

In addition, after the electro-optical panel 40 to which the first transparent plate 56 is adhered and the heat dissipation member 30 are accommodated inside of the frame 60, the heat dissipation member 30 may be used for the position determination of the second transparent plate 57. Specifically, after the electro-optical panel 40 to which the first transparent plate 56 is adhered and the heat dissipation member 30 are accommodated inside of the frame 60, the second transparent plate 57 is inserted through the opening portion 38 of the heat dissipation member 30, and in a state of position determination of the second transparent plate 57 by the heat dissipation member 30, the second transparent plate 57 and the second substrate 52 of the electro-optical panel 40 are overlapped via the adhesive. Thereafter, the light shielding plate 80 is coupled to the frame 60, and in this state, the adhesive P is cured.

Modification Example 1 of Embodiment 5

In the electro-optical module 10 described in Embodiment 5 above, a configuration may be adopted, in which the light shielding plate 80 is not used, and the cooling air smoothly flows from the other side Y2 in the Y-axis direction to the one side Y1 along the surface of the one side Z1 of the second transparent plate 57 in the Z-axis direction as described in the modification example 1 of Embodiment 3.

Modification Example 2 of Embodiment 5

In the electro-optical module 10 described in Embodiment 5 and the modification example 1 of Embodiment 5 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 5

In the electro-optical module 10 described in Embodiment 5 and the modification example 1 of Embodiment 5 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 6

Figure 16A:
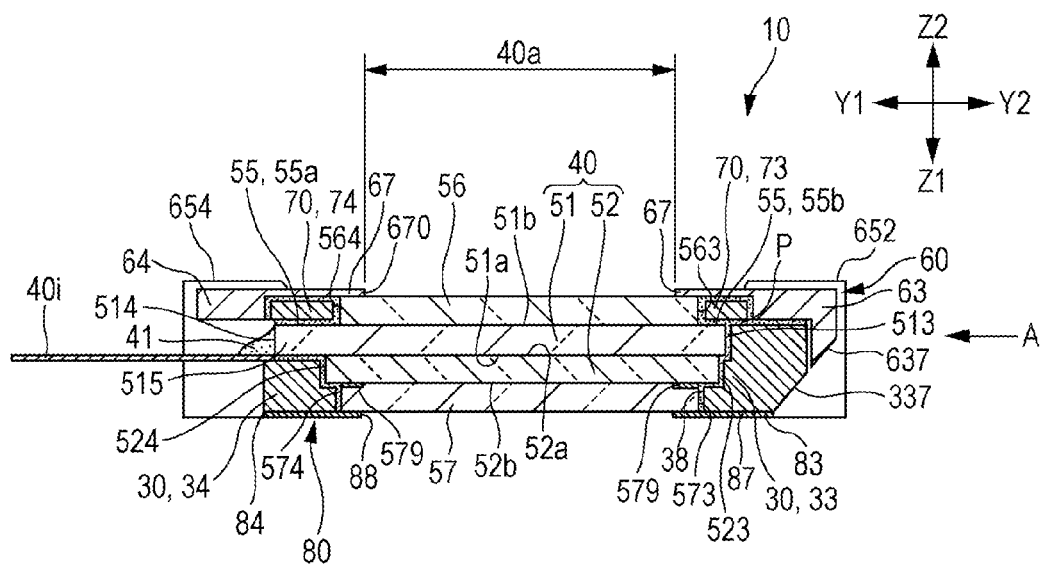
FIG. 16A and FIG. 16B are cross-sectional views of an electro-optical module in Embodiment 6 of the invention.
Figure 16B:
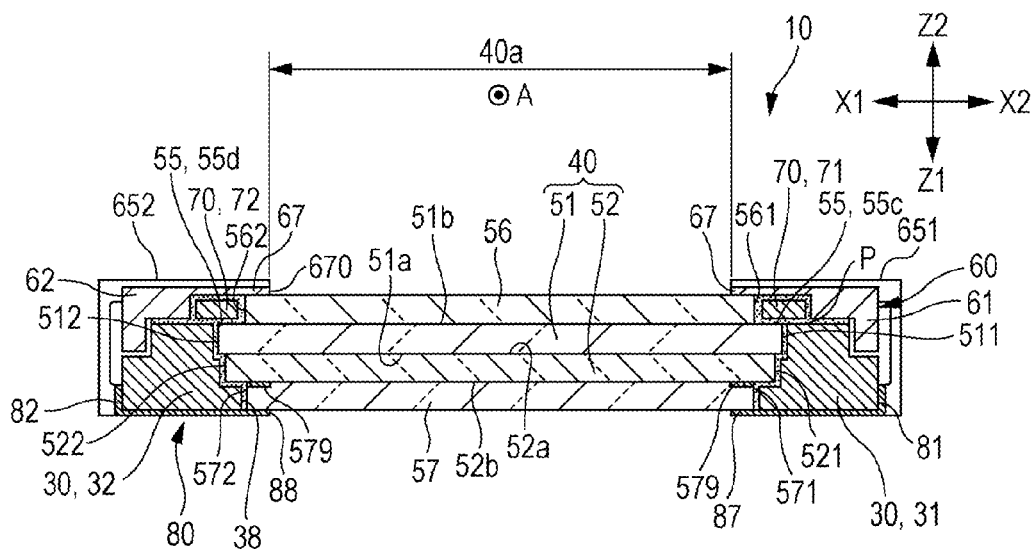

FIG. 16A and FIG. 16B are cross-sectional views of an electro-optical module 10 in Embodiment 6 of the invention. FIG. 16A is a YZ cross-sectional view of the electro-optical module and FIG. 16B is an XZ cross-sectional view of the same. Since the basic configuration in the present embodiment is similar to that in Embodiment 1, the common portions will be referred to by the same signs, and the description thereof will be omitted.

As illustrated in FIG. 16A and FIG. 16B, in the electro-optical module 10 in the present embodiment also, similarly to Embodiment 1, the heat dissipation member 30 is disposed between the electro-optical panel 40 and the frame 60. In addition, similarly to Embodiment 1, the size of the first transparent plate 56 is smaller than that of the first substrate 51, and on the surface of the first transparent plate 56 side of the first substrate 51, the protrusion surface 55 protruding from the first transparent plate 56 is formed over the entire circumference of the first transparent plate 56.

In the present embodiment, similarly to Embodiment 2, there is a wide gap between the side surfaces 561, 562, 563, and 564 of the first transparent plate 56 and the frame 60. Therefore, in the gap formed between the side surfaces 561, 562, 563, and 564 of the first transparent plate 56 and the frame 60, a rectangular frame-shaped plate 70 is disposed, and thus, the heat of the electro-optical panel 40 can be released to the frame 60 via the plate 70 and the heat dissipation member 30.

Modification Example 1 of Embodiment 6

In the electro-optical module 10 described in Embodiment 6 above, a configuration may be adopted, in which the light shielding plate 80 is not used, and the cooling air smoothly flows from the other side Y2 in the Y-axis direction to the one side Y1 along the surface of the one side Z1 of the second transparent plate 57 in the Z-axis direction as described in the modification example 1 of Embodiment 3.

Modification Example 2 of Embodiment 6

In the electro-optical module 10 described in Embodiment 6 and the modification example 1 of Embodiment 6 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 6

In the electro-optical module 10 described in Embodiment 6 and the modification example 1 of Embodiment 6 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 7

Figure 17A:
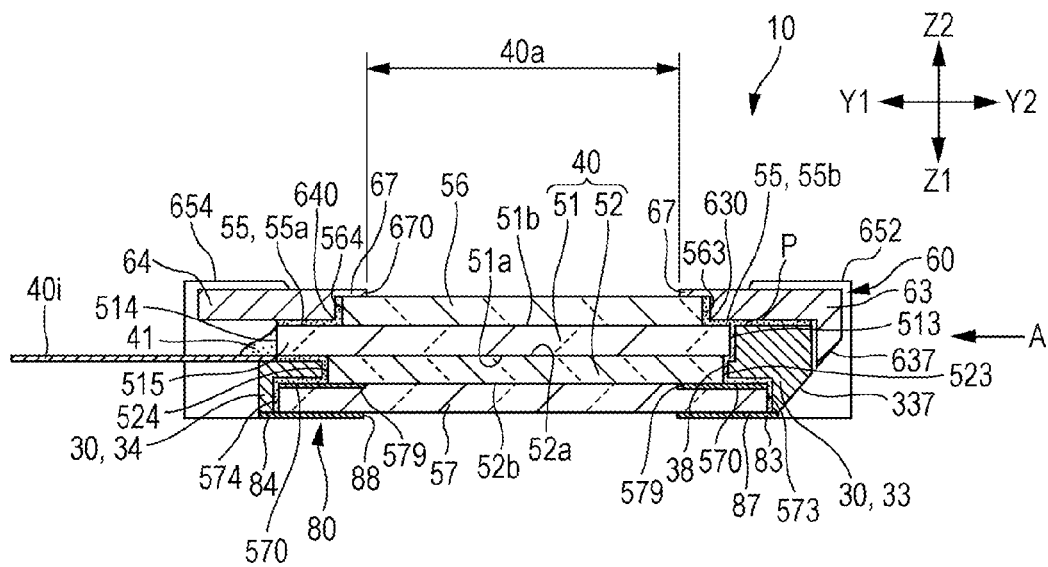
FIG. 17A and FIG. 17B are cross-sectional views of an electro-optical module in Embodiment 7 of the invention.
Figure 17B:
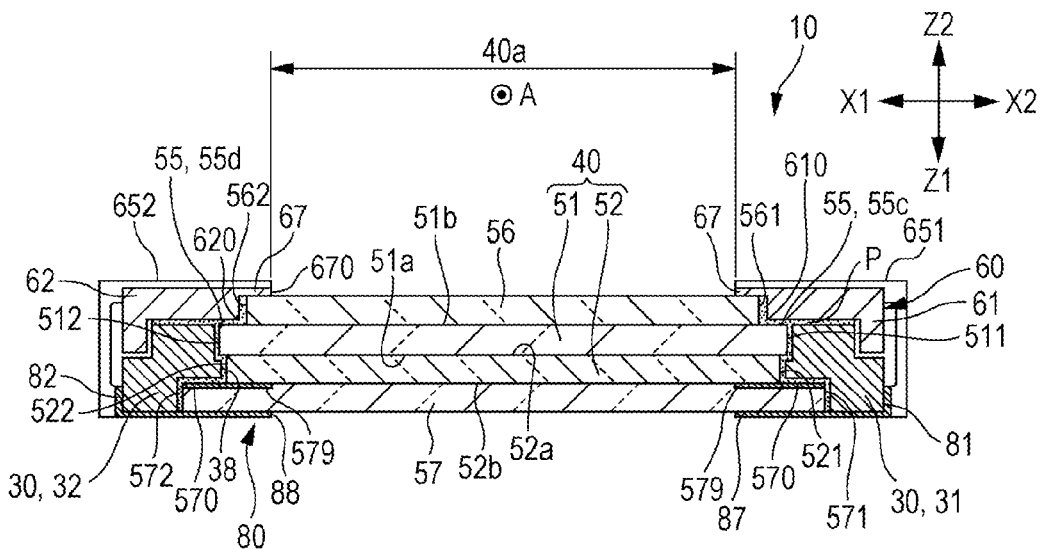

FIG. 17A and FIG. 17B are cross-sectional views of an electro-optical module 10 in Embodiment 7 of the invention. FIG. 17A is a YZ cross-sectional view of the electro-optical module and FIG. 17B is an XZ cross-sectional view of the same. Since the basic configuration in the present embodiment is similar to that in Embodiment 1, the common portions will be referred to by the same signs, and the description thereof will be omitted.

As illustrated in FIG. 17A and FIG. 17B, in the electro-optical module 10 in the present embodiment also, similarly to Embodiment 1, the heat dissipation member 30 is disposed between the electro-optical panel 40 and the frame 60. In addition, each of corner portions 610, 620, 630, and 640 of the frame 60 faces the protrusion surface 55 protruding from the first transparent plate 56 of the first substrate 51 and the side surfaces 561, 562, 563, and 564 of the first transparent plate 56. In addition, similarly to Embodiment 5, the frame 60 is disposed on the part corresponding to the other side Z2 of the electro-optical module 10 in the Z-axis direction, and on the part corresponding to the one side Z1 of the electro-optical module 10 in the Z-axis direction, the heat dissipation member 30 is disposed. In addition, similarly to Embodiment 3, the second transparent plate 57 has a larger size than the second substrate 52 and has a rectangular shape, the light shielding layer 579 is formed up to the edge of the second transparent plate 57, and the end portion of the one side Z1 of the heat dissipation member 30 in the Z-axis direction faces the light shielding layer 579.

Modification Example 1 of Embodiment 7

In the electro-optical module 10 described in Embodiment 7 above, a configuration may be adopted, in which the light shielding plate 80 is not used, and the cooling air smoothly flows from the other side Y2 in the Y-axis direction to the one side Y1 along the surface of the one side Z1 of the second transparent plate 57 in the Z-axis direction as described in the modification example 1 of Embodiment 3.

Modification Example 2 of Embodiment 7

In the electro-optical module 10 described in Embodiment 7 and the modification example 1 of Embodiment 7 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 7

In the electro-optical module 10 described in Embodiment 7 and the modification example 1 of Embodiment 7 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 8

Figure 18A:
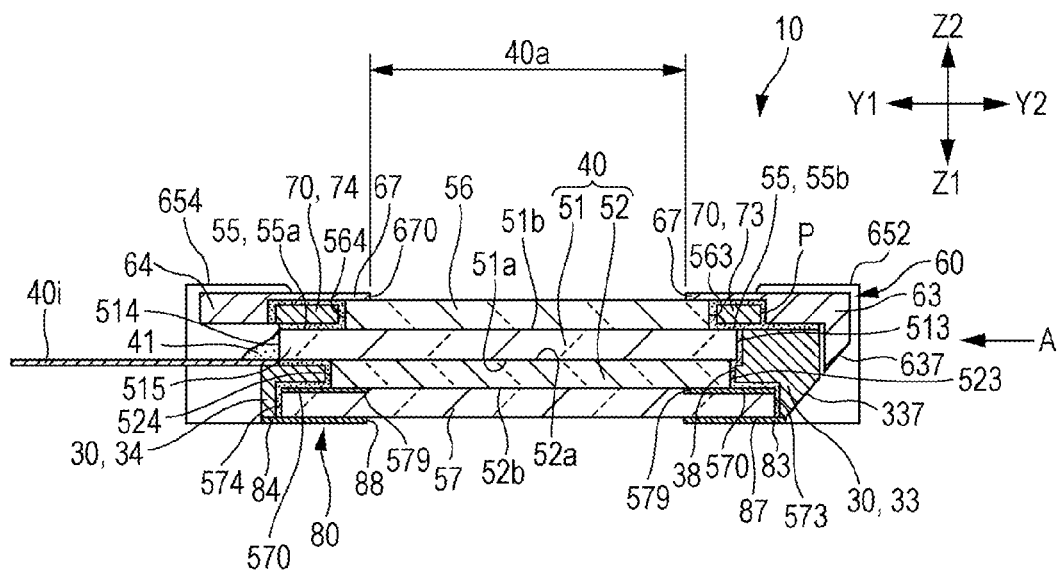
FIG. 18A and FIG. 18B are cross-sectional views of an electro-optical module in Embodiment 8 of the invention.
Figure 18B:
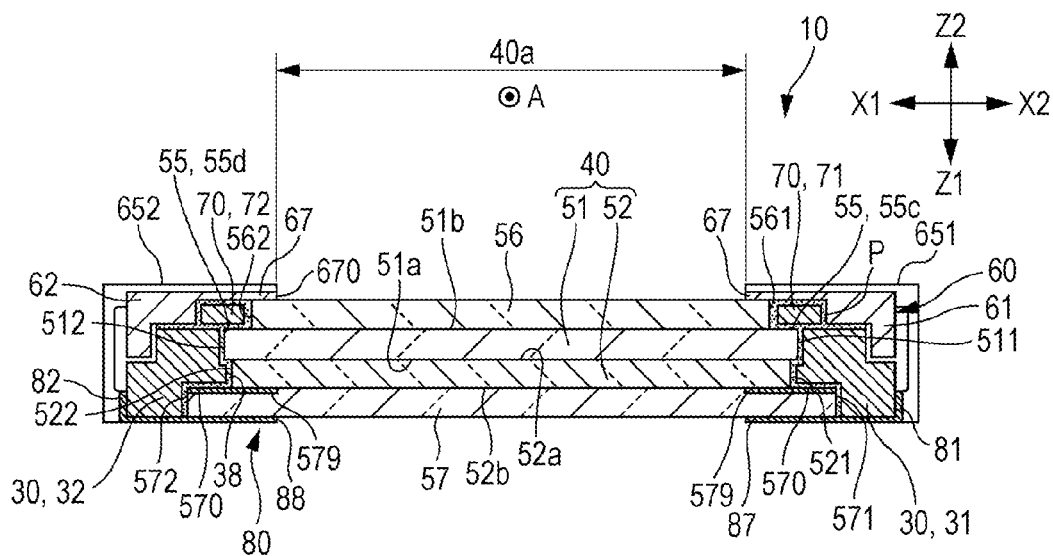

FIG. 18A and FIG. 18B are cross-sectional views of an electro-optical module 10 in Embodiment 8 of the invention. FIG. 15A is a YZ cross-sectional view of the electro-optical module and FIG. 15B is an XZ cross-sectional view of the same. Since the basic configuration in the present embodiment is similar to that in Embodiment 1, the common portions will be referred to by the same signs, and the description thereof will be omitted.

As illustrated in FIG. 18A and FIG. 18B, in the electro-optical module 10 in the present embodiment also, similarly to Embodiment 1, the heat dissipation member 30 is disposed between the electro-optical panel 40 and the frame 60. In addition, similarly to Embodiment 5, the frame 60 is disposed only on the part corresponding to the other side Z2 of the electro-optical module 10 in the Z-axis direction, and on the part corresponding to the one side Z1 of the electro-optical module 10 in the Z-axis direction, the heat dissipation member 30 is disposed. In addition, similarly to Embodiment 3, the second transparent plate 57 has a larger size than the second substrate 52 and has a rectangular shape, the light shielding layer 579 is formed up to the edge of the second transparent plate 57, and the end portion of the one side Z1 of the heat dissipation member 30 in the Z-axis direction faces the light shielding layer 579. In addition, similarly to Embodiment 1, the size of the first transparent plate 56 is smaller than that of the first substrate 51, and on the surface of the first transparent plate 56 side of the first substrate 51, the protrusion surface 55 protruding from the first transparent plate 56 is formed over the entire circumference of the first transparent plate 56.

In the present embodiment, similarly to Embodiment 2, there is a wide gap between the side surfaces 561, 562, 563, and 564 of the first transparent plate 56 and the frame 60. Therefore, in the gap formed between the side surfaces 561, 562, 563, and 564 of the first transparent plate 56 and the frame 60, a rectangular frame-shaped plate 70 is disposed, and thus, the heat of the electro-optical panel 40 can be released to the frame 60 via the plate 70 and the heat dissipation member 30.

Modification Example 1 of Embodiment 8

In the electro-optical module 10 described in Embodiment 8 above, a configuration may be adopted, in which the light shielding plate 80 is not used, and the cooling air smoothly flows from the other side Y2 in the Y-axis direction to the one side Y1 along the surface of the one side Z1 of the second transparent plate 57 in the Z-axis direction as described in the modification example 1 of Embodiment 3.

Modification Example 2 of Embodiment 8

In the electro-optical module 10 described in Embodiment 8 and the modification example 1 of Embodiment 8 above, a configuration may be adopted, in which the light shielding layer 569 for forming the boarder is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 3 of Embodiment 8

In the electro-optical module 10 described in Embodiment 8 and the modification example 1 of Embodiment 8 above, a configuration may be adopted, in which the size of the first transparent plate 56 is larger than that of the first substrate 51, the light shielding layer 569 for forming the boarder is formed on the surface of the electro-optical panel 40 side, and the plate-shaped light shielding portion 67 is not provided on the first transparent plate 56 side as described in the modification example 2 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Other Embodiments

In the embodiments described above, the relationships between the width of the protrusion surface 55 protruding from the first transparent plate 56 of the first substrate 51 and the overlapping area of the protrusion surface 55 and the frame 60 is: protrusion surfaces 55c and 55d ≅protrusion surface 55b<protrusion surface 55a. However, it is preferable that the relationships be: protrusion surfaces 55c and 55d<protrusion surface 55b<protrusion surface 55a.

In a case where the cooling air is supplied to the electro-optical module 10, since a side opposite to the side where the protrusion portion 515 to which the flexible wiring board 40i is connected is positioned becomes the windward side, if the overlapping width of the protrusion surface 55 of the first substrate 51 and the frame 60 in the windward side increases, the efficiency of the heat dissipation increases. Therefore, even if the overlapping width of the third protrusion surfaces 55c and 55d positioned between the first protrusion surface 55a and the second protrusion surface 55b and the frame 60 decreases, it is possible to assure sufficient heat dissipation in view of the whole electro-optical module 10. Therefore, it is possible to decrease the width of the electro-optical module 10 by as much as the decreased overlapping width of the third protrusion surfaces 55c and 55d and the frame 60.

In addition, in any embodiments described above, by providing a rib on the surface of the other side Z2 of the frame portion 61, 62, 63, and 64 of the frame 60 in the Z-axis direction, which extends in the Y-axis direction (the cooling air flowing direction), the surface area of the frame 60 may be expanded and thus, the heat dissipation of the frame 60 may be increased.

In the embodiments described above, the electro-optical module 10 that includes the transmission-type electro-optical panel 40 is exemplified. However, the invention may be applied to an electro-optical module 10 that includes the reflection-type electro-optical panel 40.

In the embodiments described above, a front projection-type display apparatus that performs the projection from the direction of observing the projected image is exemplified as the projection-type display apparatus. However, the invention may be applied to a projection-type display apparatus used in a rear projection-type display apparatus that performs projection from the opposite side to the direction of observing the projected image.

In the embodiments described above, the liquid crystal panel is exemplified as the electro-optical panel for describing. However, the invention is not limited thereto, and may be applied to an electro-optical module that uses an organic electroluminescent display panel, a plasma display panel, a field emission display (FED) panel, a surface-conduction electron-emitter display (SED) panel, a light emitting diode (LED) display panel, and an electrophoretic display panel.

The electro-optical module to which the invention is applied may be used as a direct view-type display device in an electronic apparatus such as a head-mounted-type display, a mobile phone, a personal digital assistant (PDA), a digital camera, an LCD television set, a car navigation device, a video phone, a POS terminal, and an apparatus that includes a touch panel, in addition to the electronic apparatus (projection-type display apparatus) described above.

This application claims priority to Japan Patent Application No. 2013-247382 filed Nov. 29, 2013, the entire disclosures of which are hereby incorporated by reference in their entireties.

What is claimed is:
1. An electro-optical module comprising:
an electro-optical panel that includes a first substrate, a second substrate which is disposed so as to face the first substrate and an electro-optical material layer which is provided between the first substrate and second substrate, and in which a terminal is provided on the surface of the protrusion portion on the second substrate side protruding from the first substrate on the first side surface of the second substrate;

a frame that surrounds the side surface of the first substrate at a second side surface side adjacent to one end of the first side surface in the second substrate and at a third side surface side adjacent to the other end of the first side surface in the second substrate; and a heat dissipation member that includes a first frame portion which faces the surface of the protrusion portion on the second substrate side and the first side surface, a second frame portion that extends toward between the second side surface and the frame from one end side of the first frame portion, and a third frame portion that extends toward between the third side surface and the frame from the other end side of the first frame portion.

2. The electro-optical module according to claim 1, wherein, on the second side surface side, the second frame portion faces the side surface of the first substrate, the second side surface, and the frame, and wherein, on the third side surface side, the third frame portion faces the side surface of the first substrate, the third side surface, and the frame.

3. The electro-optical module according to claim 1, wherein an adhesive is interposed between the first side surface and the first frame portion, between the frame and the second frame portion, and between the frame and the third frame portion.

4. The electro-optical module according to claim 1, wherein the frame surrounds a fourth side surface positioned on the opposite side across the second side surface and the third side surface with respect to the first side surface in the second substrate, and wherein, at the opposite side across the second substrate with respect to the first frame portion, the heat dissipation member includes a fourth frame portion that extends between the fourth side surface and the frame.

5. The electro-optical module according to claim 1, wherein, in a plan view, the width of the first frame portion is larger than that of the second frame portion and that of the third frame portion.

6. The electro-optical module according to claim 1, wherein, a second substrate side transparent plate is disposed to be overlapped on the surface of the second substrate to the opposite side of the first substrate, in a state in which a part of the surface of the second substrate side protrudes, wherein, on the surface of the second substrate side of the second substrate side transparent plate, a light shielding layer that includes at least one of a metal or a metal compound is formed on the protrusion surface protruding from the second substrate, and on a part of the area of the second substrate side transparent plate overlapping the second substrate, and wherein the heat dissipation member faces the light shielding layer.

7. The electro-optical module according to claim 1, wherein a first substrate side transparent plate is disposed to be overlapped on the surface of the first substrate on the opposite side to the second substrate in a state in which a part of the surface of the first substrate on the second substrate side protrudes, and wherein, on the side surface of the first substrate side transparent plate and the surface of the first substrate on the first substrate side transparent plate side, the frame faces the protrusion surface protruding from the first substrate side transparent plate.

8. The electro-optical module according to claim 1, wherein a first substrate side transparent plate is disposed to be overlapped on the surface of the first substrate on the opposite side to the second substrate in a state in which a part of the surface of the first substrate on the second substrate side protrudes, wherein, a plate that has thermal conductivity higher than that of the first substrate and the second substrate is disposed between the frame and the first substrate side transparent plate, and wherein, on the side surface of the first substrate side transparent plate and on the surface of the first substrate on the first substrate side transparent plate side, the plate faces the protrusion surface protruding from the first substrate side transparent plate and the frame.

9. The electro-optical module according to claim 1, wherein the thermal conductivity of the heat dissipation member is higher than that of the frame.

10. The electro-optical module according to claim 1, wherein a flexible wiring board is connected to the terminal, and wherein an insulation member is provided on at least one of: between the flexible wiring board and the heat dissipation member and between the surface of the protrusion portion on the second substrate side and the protrusion surface protruding from the flexible wiring board.

11. The electro-optical module according to claim 1, wherein the first substrate is an element substrate that includes a pixel electrode and a switching element provided corresponding to the pixel electrode.

12. The electro-optical module according to claim 11, wherein the electro-optical panel is a liquid crystal panel that includes a liquid crystal layer as an electro-optical material layer.

13. A projection-type display apparatus that is an electronic apparatus including the electro-optical module according to claim 1, comprising:

a light source portion that emits light which is supplied to the electro-optical module, and a projection optical system in which the light modulated by the electro-optical module is projected.

14. A projection-type display apparatus that is an electronic apparatus including the electro-optical module according to claim 2, comprising:

a light source portion that emits light which is supplied to the electro-optical module, and a projection optical system in which the light modulated by the electro-optical module is projected.

15. A projection-type display apparatus that is an electronic apparatus including the electro-optical module according to claim 3, comprising:

a light source portion that emits light which is supplied to the electro-optical module, and a projection optical system in which the light modulated by the electro-optical module is projected.

16. A projection-type display apparatus that is an electronic apparatus including the electro-optical module according to claim 4, comprising:

a light source portion that emits light which is supplied to the electro-optical module, and a projection optical system in which the light modulated by the electro-optical module is projected.

17. A projection-type display apparatus that is an electronic apparatus including the electro-optical module according to claim 5, comprising:
- a light source portion that emits light which is supplied to the electro-optical module, and
- a projection optical system in which the light modulated by the electro-optical module is projected.

18. A projection-type display apparatus that is an electronic apparatus including the electro-optical module according to claim 6, comprising:
- a light source portion that emits light which is supplied to the electro-optical module, and
- a projection optical system in which the light modulated by the electro-optical module is projected.

19. A projection-type display apparatus that is an electronic apparatus including the electro-optical module according to claim 7, comprising:
- a light source portion that emits light which is supplied to the electro-optical module, and
- a projection optical system in which the light modulated by the electro-optical module is projected.

20. The projection-type display apparatus according to claim 13, further comprising:
- a cooling device that supplies cooling air to the electro-optical module.

* * * * *